(12) United States Patent
Kusunoki et al.

(10) Patent No.: US 9,862,803 B2
(45) Date of Patent: Jan. 9, 2018

(54) BRANCHED ORGANOPOLYSILOXANE AND A METHOD FOR PREPARING THE SAME

(71) Applicant: SHIN-ETSU CHEMICAL CO., LTD., Tokyo (JP)

(72) Inventors: Takayuki Kusunoki, Annaka (JP); Yuusuke Takamizawa, Annaka (JP); Tsutomu Kashiwagi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/095,598

(22) Filed: Apr. 11, 2016

(65) Prior Publication Data

US 2016/0304675 A1    Oct. 20, 2016

(30) Foreign Application Priority Data

Apr. 15, 2015 (JP) ................. 2015-083618

(51) Int. Cl.
    *C08G 77/12* (2006.01)
    *C08G 77/00* (2006.01)
    *C08G 77/20* (2006.01)

(52) U.S. Cl.
    CPC .......... *C08G 77/80* (2013.01); *C08G 77/12* (2013.01); *C08G 77/20* (2013.01)

(58) Field of Classification Search
    None
    See application file for complete search history.

(56) References Cited

U.S. PATENT DOCUMENTS

| | | | | |
|---|---|---|---|---|
| 3,271,360 A * | 9/1966 | Williams | ............... | C07F 7/12 525/474 |
| 5,804,631 A * | 9/1998 | Mine | ..................... | C08K 3/08 257/783 |
| 6,417,310 B1 | 7/2002 | Omura et al. | | |
| 7,943,719 B2 * | 5/2011 | Hawker | ............... | C08G 77/12 528/14 |
| 2005/0006794 A1* | 1/2005 | Kashiwagi | .......... | C08L 83/04 257/788 |

(Continued)

FOREIGN PATENT DOCUMENTS

| | | |
|---|---|---|
| JP | 2000-351949 A | 12/2000 |
| JP | 2001-163981 A | 6/2001 |
| JP | 2002-348377 A | 12/2002 |

*Primary Examiner* — Robert S Loewe
(74) *Attorney, Agent, or Firm* — Oliff PLC

(57) ABSTRACT

One of the purposes of the present invention is to provide a method for preparing an organopolysiloxane having a short branch chain. In particular, the purposes of the present invention is to provide a method for preparing an organopolysiloxane having a shorter side chain than a main chain, such as a siloxane side chain having 1 to 5 siloxane units. The present preparation methods are characterized in that the starting material is an organosiloxane which is represented by the formula (1) and has two hydrolyzable groups bonded to a silicon atom at one terminal. The present invention provides a method wherein an organo(poly)siloxane represented by the formula (1) is condensation reacted to prepare an organopolysiloxane represented by formula (2) which is then used as starting materials for introducing a branch, whereby a short siloxane side chain is efficiently introduced in the organopolysiloxane, while controlling a structure of the main chain.

3 Claims, 6 Drawing Sheets

(56) References Cited

U.S. PATENT DOCUMENTS

| | | | | |
|---|---|---|---|---|
| 2006/0241269 A1* | 10/2006 | Ochs | ............ | C08G 77/38 |
| | | | | 528/15 |
| 2006/0264567 A1* | 11/2006 | Shiobara | ............ | C08L 83/04 |
| | | | | 524/588 |
| 2006/0270792 A1* | 11/2006 | Kashiwagi | ............ | C08L 83/04 |
| | | | | 524/862 |
| 2013/0266339 A1* | 10/2013 | Sugiyama | ............ | G03G 9/16 |
| | | | | 492/18 |
| 2014/0024796 A1* | 1/2014 | Mizunashi | ............ | G02B 1/041 |
| | | | | 528/31 |
| 2014/0073808 A1* | 3/2014 | Kusunoki | ............ | C08G 77/08 |
| | | | | 556/458 |
| 2014/0107309 A1* | 4/2014 | Kusunoki | ............ | C08G 77/08 |
| | | | | 528/15 |
| 2014/0367723 A1* | 12/2014 | Yamazaki | ............ | C08L 83/04 |
| | | | | 257/98 |
| 2015/0001569 A1* | 1/2015 | Yoshitake | ............ | C08L 83/14 |
| | | | | 257/98 |

* cited by examiner

BRANCHED ORGANOPOLYSILOXANE AND A METHOD FOR PREPARING THE SAME

CROSS REFERENCE

This application claims the benefits of Japanese Patent Application No. 2015-083618 filed on Apr. 15, 2015, the contents of which are herein incorporated by reference.

FIELD OF TER INVENTION

The present invention relates to a method for preparing a branched organopolysiloxane. Specifically, the present invention relates to a method for preparing an organopolysiloxane having a short siloxane branch.

It is known that branched organopolysiloxanes have better low temperature properties and thixotropic nature, compared to linear organopolysiloxanes. Therefore, the branched organopolysiloxanes are suitable as a base polymer for addition-curable compositions.

The branched organopolysiloxanes are prepared in methods where a tri-functional hydrolyzable silane, as a source for an $RSiO_{3/2}$ unit, T unit, is subjected to co-hydrolysis in the presence of an acid catalyst or is subjected to an equilibration reaction in the presence of an alkali catalyst, as described in Japanese Patent Application Laid-Open Nos. 2000-351949, 2001-163981 and 2002-348377. However, these methods cannot separately control a length of the main chain and a length of the side chain. Therefore, an organopolysiloxane having a side chain shorter than a main chain, such as a siloxane side chain having 1 to 5 siloxane units, is not obtained.

The branched organopolysiloxane is prepared by introducing siloxane having a short alkenyl group at one terminal into a linear organopolysiloxane having an SiH group at a side chain by a hydrosilylation. However, in this method, there are problems such that a remaining unreacted SiH group hydrolyzes to cause a hydrogen gas in time or condensates with each other to make a cross-link. If the one-terminal alkenyl group-containing siloxane is used in an excess quantity in order to prevent the aforesaid problems, a remaining unreacted siloxane adversely affects properties of a composition containing it. When a branched organopolysiloxane having an SiH group at the terminal of a branched chain is prepared in the aforesaid method, while leaving the SiH group at a terminal, because the addition reactivity of the terminal SiH group is high, it is impossible to introduce the branched chain only in a side chain remaining a SiH group at only a terminal. When a side chain is introduced by a hydrosilylation, a silalkylene chain linking the side chain and a main chain has poorer heat resistance and UV resistance, compared to a siloxane chain.

PRIOR LITERATURES

Patent Literatures

[Patent Literature 1] Japanese Patent Application Laid-Open No. 2000-351949
[Patent Literature 2] Japanese Patent Application Laid-Open No. 2001-163981
[Patent Literature 3] Japanese Patent Application Laid-Open No. 2002-348377

DISCLOSURE OF THE INVENTION

Problems to be Solved by the Invention

One of the purposes of the present invention is to provide a method for preparing an organopolysiloxane having a short branch chain. In particular, the purposes of the present invention is to provide a method for preparing an organopolysiloxane having a shorter side chain than a main chain, such as a siloxane side chain having 1 to 5 siloxane units.

Means to Solve the Problems

To solve the aforesaid problems, the present inventors have made research and found that a method where an organo(poly)siloxane represented by the following formula (1) is condensation reacted to prepare an organopolysiloxane represented by formula (2) which is then used as a starting material for introducing a branch, whereby a short siloxane side chain is efficiently introduced in the organopolysiloxane, while controlling a structure of the main chain.

Thus, the first aspect of the present invention provides a method for preparing a branched organopolysiloxane represented by the following formula (5):

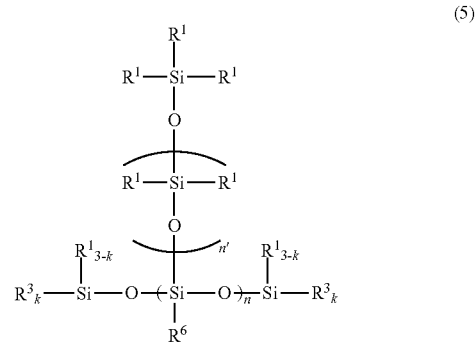

(5)

wherein $R^1$ is, independently of each other, a substituted or unsubstituted, saturated hydrocarbon group having 1 to 12 carbon atoms or a substituted or unsubstituted, aromatic hydrocarbon group having 6 to 12 carbon atoms, $R^3$ is, independently of each other, a hydrogen atom or an alkenyl group having 2 to 10 carbon atoms, $R^6$ is selected from the afore-mentioned groups defined for $R^1$ and $R^3$, n' is an integer of from 0 to 3, k is an integer of from 0 to 3, and n is an integer of from 3 to 100,
wherein the method comprises steps of
subjecting an organo(poly)siloxane represented by the following formula (1) to a condensation reaction to thereby prepare an organopolysiloxane represented by the following formula (2);

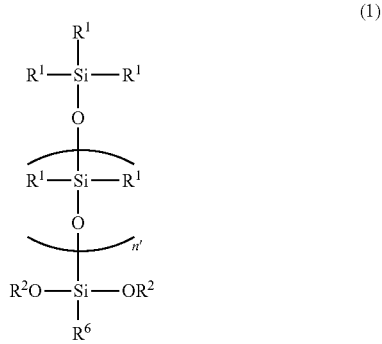

(1)

wherein $R^1$, $R^6$ and n' are as defined above and $R^2$ is a hydrogen atom or a saturated hydrocarbon group having 1 to 6 carbon atoms,

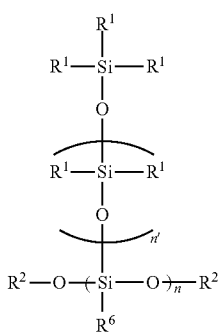

(2)

wherein $R^1$, $R^2$, $R^6$, n' and n are as defined above,
and reacting the organopolysiloxane represented by the formula (2) with an organic silicon compound represented by the following formula (3) and/or an organic silicon compound represented by the following formula (4) to prepare the branched organopolysiloxane represented by the aforesaid formula (5);

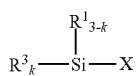

(3)

wherein $R^1$, $R^3$ and k are as defined above, and X is a hydrolyzable group or a halogen atom;

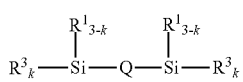

(4)

wherein $R^1$, $R^3$ and k are as defined above, and Q is an oxygen atom or =N—H.

The second aspect of the present invention provides a method for preparing a branched organopolysiloxane represented by the following formula (10):

(10)

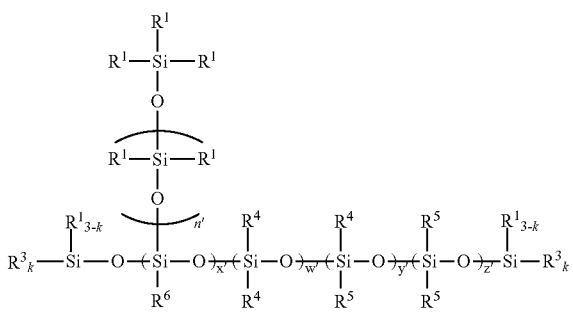

wherein $R^1$ is, independently of each other, a substituted or unsubstituted, saturated hydrocarbon group having 1 to 12 carbon atoms or a substituted or unsubstituted, aromatic hydrocarbon group having 6 to 12 carbon atoms, $R^3$ is, independently of each other, a hydrogen atom or an alkenyl group having 2 to 10 carbon atoms, $R^4$ is, independently of each other, the afore-mentioned groups defined for $R^3$ or a substituted or unsubstituted, saturated hydrocarbon group having 1 to 12 carbon atoms, $R^5$ is, independently of each other, the afore-mentioned groups defined for $R^3$ or a substituted or unsubstituted, aromatic hydrocarbon group having 6 to 12 carbon atoms, $R^6$ is selected from the afore-mentioned groups defined for $R^1$ and $R^3$, n' is an integer of from 0 to 3, k is an integer of from 0 to 3, x' is an integer of from 1 to 100, w' is an integer of from 0 to 300, y' is an integer of from 0 to 300, z' is an integer of from 0 to 100, a total of w', y' and z' is 1 or more, a total of x', w', y' and z' is 3 to 500, wherein the parenthesized siloxane units may form a block unit or bond randomly;
wherein the method comprises steps of
condensation reacting an organo(poly)siloxane represented by the following formula (1) with one or more kinds of organic silicon compounds selected from the group consisting of organic silicon compounds represented by $R^4{}_2SiX_2$, $R^4R^5SiX_2$ or $R^5{}_2SiX_2$, wherein $R^4$ and $R^5$ are as defined above and X is a hydrolyzable group or a halogen atom, and an organic silicon compound represented by the following formula (6) to thereby prepare an organopolysiloxane represented by the following formula (7);

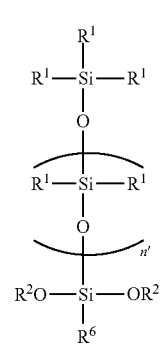

(1)

wherein $R^1$, $R^6$ and n' are as defined above and $R^2$ is a hydrogen atom or a saturated hydrocarbon group having 1 to 6 carbon atoms,

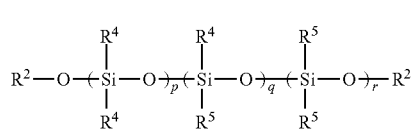

(6)

wherein $R^2$, $R^4$ and $R^5$ are as defined above, p is an integer of from 0 to 200, q is an integer of from 0 to 200, r is an integer of from 0 to 50, a total of p, q and r is 2 to 400, wherein the parenthesized siloxane units may form a block unit or bond randomly;

(7)

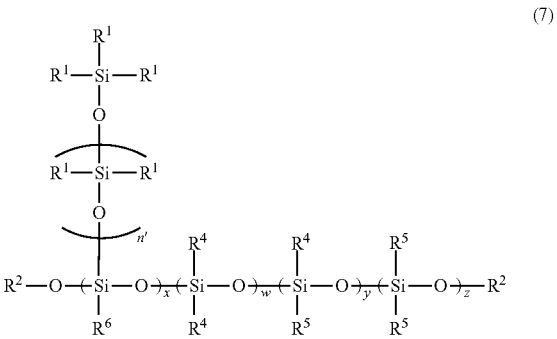

wherein $R^1$, $R^2$, $R^4$, $R^5$, $R^6$ and n' are as defined above, x is an integer of from 1 to 100, w is an integer of from 0 to 300, y is an integer of from 0 to 300, z is an integer of from 0 to 100, a total of w, y and z is 1 or more, a total of x, w, y and z is 3 to 500, w' is equal to or larger than w, y' is equal to or larger than y, z' is equal to or larger than z, wherein the parenthesized siloxane units may form a block unit or bond randomly; and reacting the organopolysiloxane represented by the formula (7) with an organic silicon compound represented by the following formula (3) and/or an organic silicon compound represented by the following formula (8) to prepare the branched organopolysiloxane represented by the aforesaid formula (10);

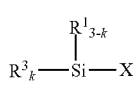

(3)

wherein $R^1$, $R^3$ and k are as defined above and X is a hydrolyzable group or a halogen atom;

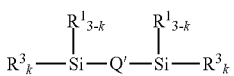

(8)

wherein $R^1$, $R^3$ and k are as defined above and Q' is an oxygen atom, =N—H, or a polysiloxane residue represented by the following formula (9):

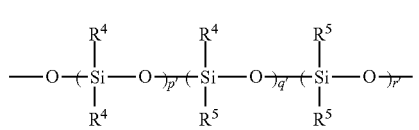

(9)

wherein $R^4$ and $R^5$ are as defined above, p' is an integer of from 0 to 50, q' is an integer of from 0 to 50, r' is an integer of from 0 to 25, a total of p', q' and r' is 1 or more, w' is equal to or larger than p', y' is equal to or larger than q', z' is equal to or larger than r'.

The third aspect of the present invention provides a method for preparing a branched organopolysiloxane represented by the following formula (11):

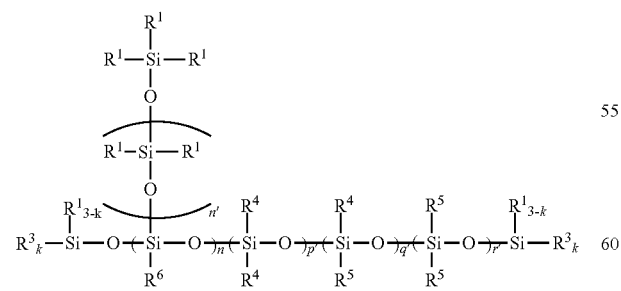

(11)

wherein $R^1$ is, independently of each other, a substituted or unsubstituted, saturated hydrocarbon group having 1 to 12 carbon atoms or a substituted or unsubstituted, aromatic hydrocarbon group having 6 to 12 carbon atoms, $R^3$ is, independently of each other, a hydrogen atom or an alkenyl group having 2 to 10 carbon atoms, $R^4$ is, independently of each other, the afore-mentioned groups defined for $R^3$ or a substituted or unsubstituted, saturated hydrocarbon group having 1 to 12 carbon atoms, $R^5$ is, independently of each other, the afore-mentioned groups defined for $R^3$ or a substituted or unsubstituted, aromatic hydrocarbon group having 6 to 12 carbon atoms, $R^6$ is selected from the afore-mentioned groups defined for $R^1$ and $R^3$, n' is an integer of from 0 to 3, k is an integer of from 0 to 3, n is an integer of from 3 to 100, p' is an integer of from 0 to 50, q' is an integer of from 0 to 50, r' is an integer of from 0 to 25, a total of p', q' and r' is 1 or more, a total of n, p', q' and r' is 5 to 200, wherein the parenthesized siloxane units may form a block unit or bond randomly;

wherein the method comprises steps of subjecting an organo (poly)siloxane represented by the following formula (1) to a condensation reaction to thereby prepare an organopolysiloxane represented by the following formula (2);

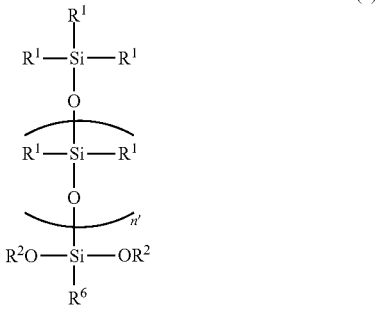

(1)

wherein $R^1$, $R^6$ and n' are as defined above and $R^2$ is a hydrogen atom or a saturated hydrocarbon group having 1 to 6 carbon atoms,

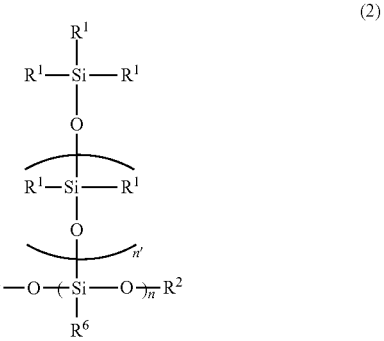

(2)

wherein $R^1$, $R^2$, $R^6$, n' and n are as defined above, and reacting the organopolysiloxane represented by the formula (2) with an organic silicon compound represented by the following formula (13) to prepare the branched organopolysiloxane represented by the aforesaid formula (11);

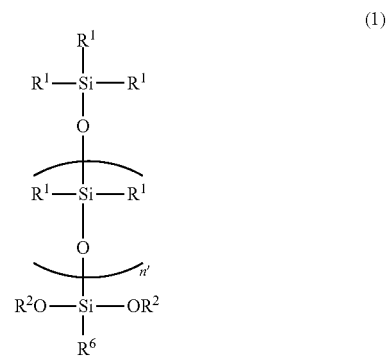

(13)

wherein $R^2$, $R^3$, $R^4$, $R^5$, k, p', q' and r' are as defined above.

Further, the present invention provides the aforesaid branched organopolysiloxanes represented by the aforesaid formula (5), (10) or (11).

Effects of the Invention

According to the present invention, a siloxane branch whose length is shorter than the length of a main chain, such as 1 to 5 siloxane units, is easily introduced in an organopolysiloxane, while controlling a structure of a main chain. The present method suppressed undesired cyclic polysiloxanes which occurs as a by-product often in conventional methods. An addition-curable organopolysiloxane composition containing the present branched organopolysiloxane provides a cured product having a lower glass-transition temperature, compared to a composition comprising a linear organopolysiloxane which has the comparable number of siloxane units as those in the main chain of the present branched organosiloxane, and provides a cured product having improved crack resistance.

BEST MODE OF THE INVENTION

Figure 1:
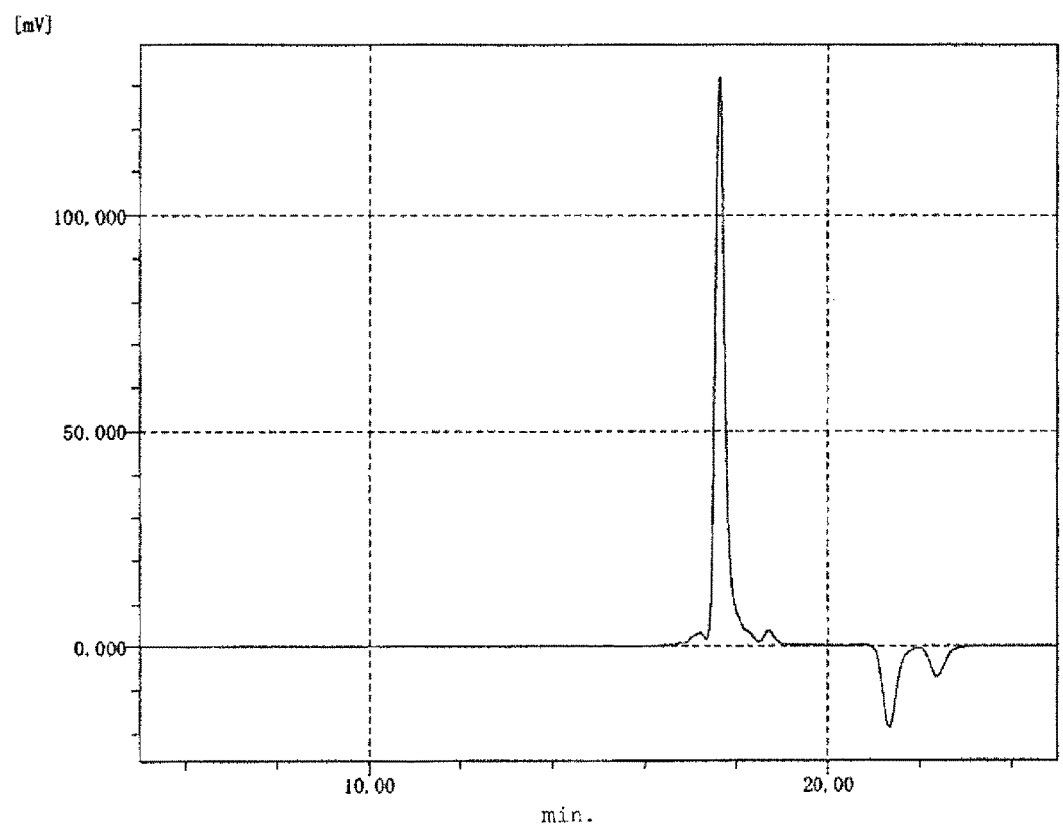
FIG. 1 is a GPC chart of the organosiloxane prepared in Synthesis Example 1.

The present invention will be described below in detail.

1. Organosiloxane as a Stating Material for the Introduction of a Branch

The aforesaid methods of the first, second and third aspects of the present invention are characterized in that the starting material is an organosiloxane which is represented by the following formula (1) and has two hydrolyzable groups bonded to a silicon atom at one terminal, which is a starting material for introduction of a branch, is subjected to a condensation reaction. The condensation reaction is carried out preferably in the presence of a catalyst. The catalyst will be described below in detail.

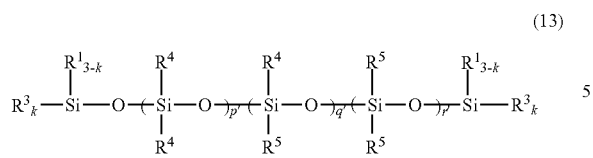

(1)

wherein $R^1$ is, independently of each other, a substituted or unsubstituted, saturated hydrocarbon group having 1 to 12 carbon atoms or a substituted or unsubstituted, aromatic hydrocarbon group having 6 to 12 carbon atoms, $R^2$ is, independently of each other, a hydrogen atom or a saturated hydrocarbon group having 1 to 6 carbon atoms, $R^6$ is selected from the afore-mentioned groups defined for $R^1$, a hydrogen atom or an alkenyl group having 2 to 10 carbon atoms, and n' is an integer of from 0 to 3.

In the formula (1), $R^1$ is, independently of each other, a substituted or unsubstituted, saturated hydrocarbon group having 1 to 12 carbon atoms, preferably 1 to 8 carbon atoms or a substituted or unsubstituted, aromatic hydrocarbon group having 6 to 12 carbon atoms, preferably 6 to 10 carbon atoms. Examples of the substituted or unsubstituted, saturated hydrocarbon group include alkyl groups such as a methyl group, an ethyl group, a propyl group, a butyl group, and an octyl group, and cycloalkyl groups such as a cyclopentyl group and a cyclohexyl group; and those hydrocarbon groups wherein a part or all of the hydrogen atoms bonded to the carbon atoms are substituted with a substituent such as a halogen atom such as a fluorine atom, a bromine atom and a chlorine atom, a cyano group, a glycidoxy group, a methacryloyloxy group, a mercapto group or an amino group, e.g., halogen-substituted monovalent hydrocarbon groups such as trifluoropropyl and chloropropyl groups, cyanoalkyl groups such as a β-cyanoethyl group and a γ-cyanopropyl group, 3-methacryloxypropyl group, 3-glycidyloxypropyl group, 3-mercaptopropyl group, and 3-aminopropyl group. Among these, a methyl group and a cyclohexyl group are preferred. A methyl group is more preferred. Examples of the substituted or unsubstituted, aromatic hydrocarbon group include aryl groups such as a phenyl group, a tolyl group and a naphthyl group, and aralkyl groups such as a benzyl group, a phenylethyl group and a phenylpropyl group. Among these, a phenyl group and a benzyl group are preferred. $R^6$ is selected from the afore-mentioned groups defined for $R^1$, a hydrogen atom or an alkenyl group having 2 to 10 carbon atoms, preferably 2 to 6 carbon atoms. Examples of the alkenyl group include a vinyl group, an allyl group, an isopropenyl group and a butenyl group. Among these, a methyl group, a hydrogen atom, and a vinyl group are preferred.

In the formula (1), $R^2$ is, independently of each other, a hydrogen atom or a saturated hydrocarbon group having 1 to 6 carbon atoms such as an alkyl group. Examples of alkyl group include a methyl group, an ethyl group, a n-propyl group, an isopropyl group, an isobutyl group and a t-butyl group. Among these, a hydrogen atom, a methyl group and isopropyl group are preferred. A methyl group is further preferred.

In the formula (1), $n^1$ is an integer of from 0 to 3, preferably 0 or 1, further preferably 0.

The compound represented by the aforesaid formula (1) is preferably a dialkoxysilane. Examples of the dialkoxysilane include 1,1,1,3-tetramethyl-3,3-dimethoxydisiloxane, 1-phenyl-1,1,3-trimethyl-3,3-dimethoxydisiloxane, 1,1-diphenyl-1,3-dimethyl-3,3-dimethoxydisiloxane, 1,1-diphenyl-1,3-dimethyl-3,3-diethoxydisiloxane, 1,1,1-triphenyl-3-methyl-3,3-dimethoxydisiloxane, 1,1,1-trimethyl-3-phenyl-3,3-dimethoxydisiloxane, 1,3-diphenyl-1,1-dimethyl-3,3-dimethoxydisiloxane, 1,1-diphenyl-1-methyl-3-phenyl-3,3-dimethoxydisiloxane, 1,1,1-triphenyl-3-phenyl-3,3-dimethoxydisiloxane, 1,1-diphenyl-1-methyl-3-cyclohexyl-3,3-dimethoxydisiloxane, 1,1-diphenyl-1-methyl-3-glycidyloxypropyl-3,3-dimethoxydisiloxane, 1,1-diphenyl-1-methyl-3-trifluoropropyl-3,3-dimethoxydisiloxane, 1,1,1,3,3,5-hexamethyl-5,5-dimethoxytrisiloxane, 1,1-diphenyl-1,3,3,5-tetramethyl-5,5-dimethoxytrisiloxane, 1,1,1-triphenyl-3,3,5-trimethyl-5,5-dimethoxytrisiloxane, 1,1,1,3,3-pentamethyl-5-phenyl-5,5-dimethoxytrisiloxane, 1,1,5-tripheny-1,3,3-trimethyl-5,5-dimethoxytrisiloxane, 1,1,1,5-tetraphenyl-3,3-trimethyl-5,5-dimethoxytrisiloxane, 1,1,1,5-tetramethyl-3,3-diphenyl-5,5-dimethoxytrisiloxane, 1,1,1-trimethyl-3,3,5-triphenyl-5,5-dimethoxytrisiloxane, 1,1,1,3,3,5-hexaphenyl-5,5-dimethoxytrisiloxane, 1,1-diphenyl-1-methyl-3-vinyl-3,3-dimethoxydisiloxane, 1,1-diphenyl-1-methyl-3,3-dimethoxydisiloxane, 1,1-diphenyl-1-methyl-3,3-diphenyl-5-methyl-5,5-dimethoxytrisiloxane, 1,1-diphenyl-1-methyl-3,5,7-triphenyl-3,5,7-trimethyl-9-methyl-9,9-dimethoxypentasiloxane, 1,1-diphenyl-1-methyl-3,5,7-tri(3,3,3-trifluoropropyl)-3,5,7-trimethyl-9-methyl-9,9-dimethoxypentasiloxane, and 1,1-diphenyl-1-methyl-3-(3,3,3-trifluoropropyl)-3,3-dimethoxydisiloxane.

The compound represented by the formula (1) is prepared easily with a high purity by a condensation of a triorganosilanol ($R_3SiOH$) and a monoorganotrialkoxysilane ($R^1Si(OR^2)_3$) in the presence of a catalyst. The catalyst is preferably selected from these described below and its amount is also described below. The condensation reaction may be conducted with heating. The reaction temperature is preferably 0 to 150 degrees C., further preferably 10 to 100 degrees C. The condensation reaction may be conducted without any solvent or in the presence of a solvent described below.

The compound represented by the formula (1) is condensation reacted in the presence of a catalyst to prepare the organopolysiloxane represented by the aforesaid formula (2) or (7). This step is hereinafter referred to as a condensation reaction step. Subsequently, the terminals of the organopolysiloxane are capped in a manner described below to prepare the aforesaid branched organopolysiloxane. This step is hereinafter referred to as an end-capping step. The end-capping step may be conducted in the presence of a catalyst, if needed.

2. Catalyst

The catalyst is preferably at least one of the groups consisting of acid catalysts, basic catalysts and metal compound catalysts. The metal compound catalyst is preferably hydroxides of the elements in Group 2 of the periodic table, hydrates of hydroxides of the elements in Group 2 of the periodic table, oxides of the elements in Group 2 of the periodic table, and hydroxides and oxides of the metal elements in Groups 3-15 of the periodic table.

Examples of the acid catalyst include sulfuric acid, hydrochloric acid, acetic acid, methanesulfonic acid, and trifluoromethanesulfonic acid. The acid catalyst is preferably diluted hydrochloric acid and acetic acid, in particular diluted hydrochloric acid.

Examples of the basic catalyst include potassium hydroxide, sodium hydroxide, lithium hydroxide, potassiummethoxide, sodiummethoxide, lithium methoxide, ammonia, triethylamine and tetramethylammonium hydride. The basic catalyst is preferably triethylamine and tetramethylammonium hydride, in particular triethylamine.

Examples of the metal compound catalysts include radium hydroxide, barium hydroxide, strontium hydroxide, calcium hydroxide, magnesium hydroxide, beryllium hydroxide, barium hydroxide, strontium hydroxide, barium oxide, strontium oxide, calcium oxide, magnesium oxide, beryllium oxide, lanthanum (III) hydroxide, cerium (IV) hydroxide, zirconium (IV) hydroxide, iron (II) hydroxide, iron (III) hydroxide, cobalt (II) hydroxide, nickel (II) hydroxide, copper (II) hydroxide, gold (III) hydroxide, zinc (II) hydroxide, cadmium (II) hydroxide, aluminum (III) hydroxide, indium (III) hydroxide, thallium (I) hydroxide, lead (II) hydroxide, bismuth (III) hydroxide, manganese (IV) oxide, iron (II) oxide and copper (II) oxide. Further, hydrates of the aforesaid hydroxides of the elements in Group 2 of the periodic table may be used. In particular, barium hydroxide octahydrate, barium hydroxide monohydrate and strontium hydroxide octahydrate may be used.

Preferably, the catalyst is hydroxides or oxides of the elements in Group 2 of the periodic table, hydroxide hydrates of the elements in Group 2 of the periodic table, hydroxides or oxides of the metal elements in Groups 3-15 of the periodic table or a diluted hydrochloric acid. Further preferably, the catalyst is at least one selected from the group consisting of hydroxides or oxides of the elements in Group 2 of the periodic table, hydroxide hydrates of the elements in Group 2 of the periodic table, and hydroxides or oxides of the metal elements in Groups 3-15 of the periodic table. In particular, hydroxides of elements in Group 2 of the periodic table, hydroxide hydrates of the elements in Group 2 of the periodic table, and hydroxides of the metal elements in Groups 3-15 of the periodic table are preferred in view of availability. In particular, preferred are barium hydroxide, calcium hydroxide, magnesium hydroxide, strontium hydroxide, lanthanum (III) hydroxide, aluminum (III) hydroxide, iron (II) hydroxide, iron (III) hydroxide, copper (II) hydroxide, iron (II) oxide, barium hydroxide octahydrate, barium hydroxide monohydrate and strontium hydroxide octahydrate.

The metal compound catalyst is preferably surface treated with a silane coupling agent before used in the condensation reaction. On account of the surface treatment of the catalyst with a silane coupling agent, aggregation of the catalyst is inhibited. Therefore, a catalyst can be dispersed homogeneously in a reaction system to maintain an effective surface area, so that the condensation reaction rate is made higher. That is, high activity of the catalyst is attained.

Any known silane coupling agents may be used. Particularly, in view of dispersibility of the catalyst, preferred are silane coupling agents which have a chemical structure similar to that of organic silicon compound to be condensed, particularly similar to that of the alkoxy group-containing organic silicon compound. Examples of the silane coupling agent include trimethoxysilane, triethoxysilane, methyltrimethoxysilane, decyltrimethoxysilane, vinyltrimethoxysilane, phenyltrimethoxysilane, styryltrimethoxysilane, 3,3,3-trifluoropropyltrimethoxysilane, 3-glicydyloxypropyldimethoxymethylsilane, 3-glicydyloxypropyltrimethoxysilane, 3-methacryloxypropyltrimethoxysilane, 3-aminopropyltrimethoxysilane, 3-mercaptopropyltrimethoxysilane, 3-chloropropyltrimethoxysilane, 1,1,3,3,5,5-hexamethoxy-1,3,5-trimethyltrisiloxane, 1,1,5,5-tetramethoxy-1,3,5-trimethyltrisiloxane-3-ol, dimethyldimethoxysilane, dimethyldiethoxysilane, phenylmethyldimethoxysilane, diphenyldimethoxysilane, distyryldimethoxysilane, dipentafluorophenyldimethoxysilane and hexamethyldisilazane. Among these, trimethoxysilane, vinyltrimethoxysilane, methyltrimethoxysilane and 3-glicydyloxypropyltrimethoxysilane are preferred.

The surface treatment of the metal compound catalyst with the silane coupling agent may be conducted in any conventional manner. For instance, a wet process and a dry process are utilizable. A ratio of the metal compound to the silane coupling agent is not particularly limited. However, in order not to damage the catalyst activity, the amount of the silane coupling agent is 0.001 to 10 parts by mass, further preferably 0.01 to 5 parts by mass, relative to 100 parts by mass of the metal compound catalyst.

An amount of the catalyst may be such that the condensation reaction proceeds sufficiently. For instance, the amount of the acid catalyst is preferably 0.1 to 10% by weight, further preferably 0.5 to 5% by weight, relative to a total weight of the organic silicon compound(s) to be subjected to the condensation reaction and the acid catalyst. In the case of the metal compound catalyst, the amount is preferably 0.01 to 20% by weight, further preferably 0.1 to 10% by weight, further preferably 0.2 to 9% by weight, more preferably 0.5 to 5% by weight, relative to a total weight of the organic silicon compound(s) to be subjected to the condensation reaction and the metal compound catalyst. As long as the amount of the catalyst is in the aforementioned range, a sufficient catalytic effect for the condensation reaction is attained.

3. The Preparation Methods in the First, Second, or Third Aspect of the Present Invention Will be Explained Below in Further Detail.

(1) The Preparation Method in the First Aspect

The first aspect of the present invention provides a method for preparing the branched organopolysiloxane represented by the following formula (5):

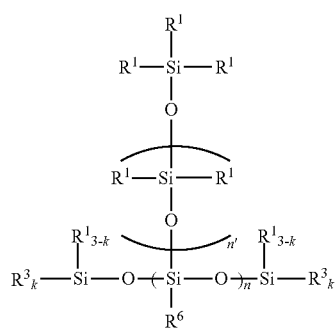

(5)

wherein $R^1$ is, independently of each other, a substituted or unsubstituted, saturated hydrocarbon group having 1 to 12 carbon atoms or a substituted or unsubstituted, aromatic hydrocarbon group having 6 to 12 carbon atoms, $R^3$ is, independently of each other, a hydrogen atom or an alkenyl group having 2 to 10 carbon atoms, $R^6$ is selected from the afore-mentioned groups defined for $R^1$ and $R^3$, n' is an integer of from 0 to 3, preferably 0 or 1, further preferably 0, k is an integer of from 0 to 3, preferably 2, and n is an integer of from 3 to 100, preferably 5 to 50.

The preparation method in the first aspect includes a condensation step and an end-capping step.

In the condensation step, the aforesaid compound represented by the formula (1) is subjected to a condensation reaction, preferably in the presence of the catalyst, to prepare the compound represented by the formula (2).

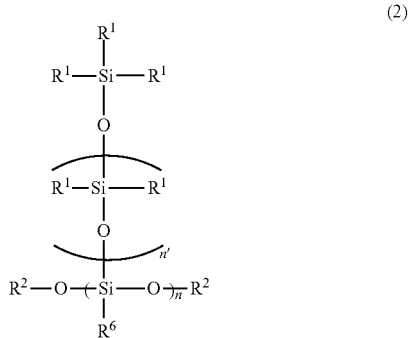

(2)

wherein $R^1$, $R^2$, $R^6$ and n' are as defined above, n is an integer of from 3 to 100, preferably 5 to 50.

In the end-capping step, the compound represented by the formula (2) is reacted with the organic silicon compound represented by the following formula (3) and/or the organic silicon compound represented by the following formula (4) to thereby be end-capped, resulting in the branched organopolysiloxane represented by the formula (5). The end-capping reaction may be conducted as a separate step after the condensation reaction, or the condensation reaction and the end-capping reaction may be conducted in a one step. The compound represented by the formula (3) or (4) may be used alone or in combination thereof. The end-capping reaction is conducted in the presence of the aforesaid catalyst, if needed.

(3)

wherein $R^1$, $R^3$ and k are as defined above and X is a hydrolyzable group or a halogen atom.

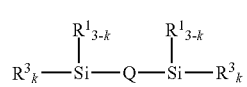

(4)

wherein $R^1$, $R^3$ and k are as defined above and Q is an oxygen atom or =N—H.

In the aforesaid formulas, $R^1$ and $R^2$ are as defined for formula (1) above. $R^3$ is a hydrogen atom or an alkenyl group having 2 to 10 carbon atoms. Examples of the alkenyl group include a vinyl group, an allyl group, an isopropenyl group and a butenyl group. $R^6$ is selected from the aforementioned groups defined for $R^1$ or $R^3$. Among these, a hydrogen atom, a methyl group and a vinyl group are preferred.

In the aforesaid formula (3), X is a hydrolyzable group or a halogen atom. Examples of the halogen atom include a chlorine atom and a bromine atom. The hydrolyzable group is represented by —OR. R is preferably a hydrogen atom or an alkyl group having 1 to 6 carbon atoms. Examples of the hydrolyzable group include a hydroxy group, a methoxy group, an ethoxy group and an isopropoxy group. Among these, a chlorine atom, a hydroxy group and a methoxy group are preferred, and a hydroxy group and a methoxy group are further preferred.

Examples of the organopolysiloxane represented by the formula (2) include 1,1-diphenyl-1,3-dimethyl-3,3-dimethoxydisiloxane, 1,1-diphenyl-1,3-dimethyl-3,3-diethoxydisiloxane, 1,1-diphenyl-1-methyl-3-phenyl-3,3-dimethoxydisiloxane, 1,1,1-triphenyl-3-methyl-3,3-dimethoxydisiloxane, 1,1,1-trimethyl-3-phenyl-3,3-dimethoxydisiloxane, 1,1-diphenyl-1,3,3,5-tetramethyl-5,5-dimethoxytrisiloxane, 1,1-diphenyl-1,5-dimethyl-3,3-diphenyl-5,5-dimethoxytrisiloxane, 1,1-diphenyl-1-methyl-3,5,7-triphenyl-3,5,7-trimethyl-9-methyl-9,9-dimethoxypentasiloxane, 1,1-diphenyl-1-methyl-3,5,7-tri(3,3,3-trifluoropropyl)-3,5,7-trimethyl-9-methyl-9,9-dimethoxypentasiloxane, and 1,1-diphenyl-1-methyl-3-(3,3,3-trifluoropropyl)-3,3-dimethoxydisiloxane, and an oligomer and polymer of the aforesaid compound represented by the formula (1).

Examples of the silicon compound represented by formula (3) include chlorosilane such as dimethylchlorosilane, monomethylmonochlorosilane, monochlorosilane, phenylmethylchlorosilane, diphenylchlorosilane, vinyldimethylchlorosilane, divinylmethylchlorosilane, trivinylchlorosilane, methylphenylvinylchlorosilane and diphenylvinylchlorosilane; alkoxysilanes such as dimethylmethoxysilane, monomethylmonomethoxysilane, monomethoxysilane, phenylmethylmethoxysilane, diphenylmethoxysilane, dimethylethoxysilane, monomethylmonoethoxysilane, monoethoxysilane, phenylmethylethoxysilane, diphenylethoxysilane, vinyldimethylmethoxysilane, divinylmethylmethoxysilane, trivinylmethoxysilane, methylphenylvinylmethoxysilane, diphenylvinylmethoxysilane, vinyldimethylethoxysilane, divinylmethylethoxysilane, trivinylethoxysilane, methylphenylvinylethoxysilane, and diphenylvinylethoxysilane; and silanols such as vinyldimethylsilanol, divinylmethylsilanol, trivinylsilanol, methylphenylvinylsilanol, and diphenylvinylsilanol. Among these, dimethylchlorosilane, vinyldimethylchlorosilane, vinyldimethylmethoxysiane and vinyldimethylsilanol are preferred.

Examples of the silicon compound represented by formula (4) include disiloxanes such as 1,1,3,3-tetramethyldisiloxane, 1,3-diphenyl-1,3-dimethyldisiloxane, 1,1,3,3-tetraphenyldisiloxane, 1,3-divinyl-1,1,3,3-tetramethyldisiloxane, 1,1,3,3-tetravinyl-1,3-dimethyldisiloxane, hexavinyldisiloxane, and 1,3-dimethyl-1,3-diphenyl-1,3-divinyldisiloxane; silazanes such as 1,1,3,3-tetramethyldisilazane, 1,3-diphenyl-1,3-dimethyldisilazane, 1,1,3,3-tetraphenyldisilazane, 1,3-divinyl-1,1,3,3-tetramethyldisilazane, 1,1,3,3-tetravinyl-1,3-dimethyldisilazane, hexavinyldisilazane and 1,3-dimethyl-1,3-diphenyl-1,3-divinyldisilazane. Among these, 1,1,3,3-tetramethyldisilazane and 1,3-divinyl-1,1,3,3-tetramethyldisiloxane are preferred.

$R^3$, i.e. a hydrogen atom and an alkenyl group, may be at the terminal or in the position of $R^6$ in the formula (5). Preferred has a branched organopolysiloxane which has a hydrogen atom or an alkenyl group only at the terminal, and a branched organopolysiloxane which has hydrogen atoms at the terminal and in the position of $R^6$.

(2) The Preparation Method in the Second Aspect

The second aspect of the present invention provides a method for preparing a branched organopolysiloxane represented by the following formula (10):

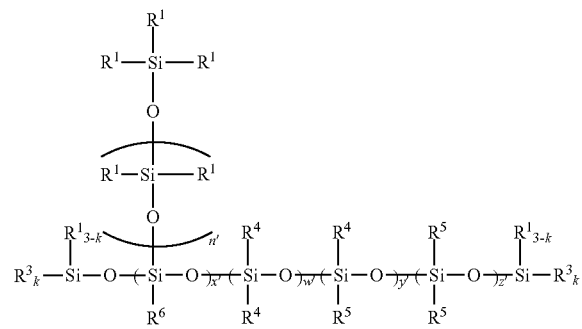

(10)

wherein $R^1$ is, independently of each other, a substituted or unsubstituted, saturated hydrocarbon group having 1 to 12 carbon atoms or a substituted or unsubstituted, aromatic hydrocarbon group having 6 to 12 carbon atoms, $R^3$ is, independently of each other, a hydrogen atom or an alkenyl group having 2 to 10 carbon atoms, $R^4$ is, independently of each other, the afore-mentioned groups defined for $R^3$ or a substituted or unsubstituted, saturated hydrocarbon group having 1 to 12 carbon atoms, $R^5$ is, independently of each other, the afore-mentioned groups defined for $R^3$ or a substituted or unsubstituted, aromatic hydrocarbon group having 6 to 12 carbon atoms, $R^6$ is selected from the afore-mentioned groups defined for $R^1$ and $R^3$, n' is an integer of from 0 to 3, preferably 0 or 1, further preferably 0, k is an integer of from 0 to 3, x' is an integer of from 1 to 100, w' is an integer of from 0 to 300, y' is an integer of from 0 to 300, z' is an integer of from 0 to 100, a total of w', y' and z' is 1 or more, a total of x', w', y' and z' is 3 to 500, wherein the parenthesized siloxane units may form a block unit or bond randomly. Preferably, x' is an integer of from 1 to 80, w' is an integer of from 0 to 200, y' is an integer of from 0 to 200, z' is an integer of from 0 to 50, a total of w', y' and z' is 2 or more, and a total of x', w', y' and z' is 5 to 300.

The preparation method in the second aspect includes a condensation step and an end-capping step.

In the condensation step, the aforesaid compound represented by the formula (1) is, preferably in the presence of the catalyst, condensation reacted with one or more kinds of the organic silicon compounds selected from the group consisting of organic silicon compounds represented by $R^4{}_2SiX_2$, $R^4R^5SiX_2$ or $R^5{}_2SiX_2$ and the organic silicon compound represented by the following formula (6) to thereby prepare the organopolysiloxane represented by the following formula (7).

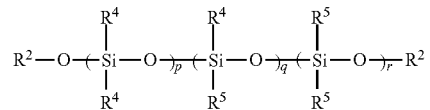

(6)

wherein $R^2$, $R^4$ and $R^5$ are as defined above, p is an integer of from 0 to 200, q is an integer of from 0 to 200, r is an integer of from 0 to 50, a total of p, q and r is 2 to 400, wherein the parenthesized siloxane units may form a block unit or bond randomly.

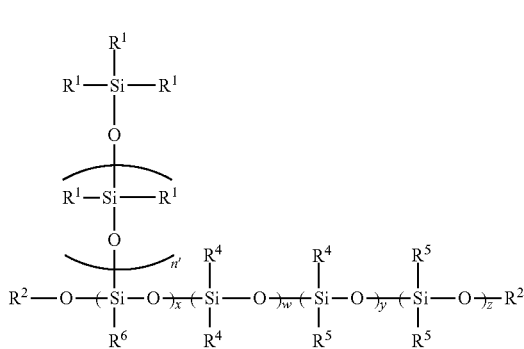

(7)

wherein $R^1$, $R^2$, $R^4$, $R^5$, $R^6$ and n' are as defined above, x is an integer of from 1 to 100, preferably 1 to 80, w is an integer of from 0 to 300, preferably 1 to 200, further preferably 1 to 100, y is an integer of from 0 to 300, preferably 1 to 200, further preferably 1 to 100, z is an integer of from 0 to 100, preferably 0 to 50, further preferably 1 to 20, a total of w, y and z is 1 or more, a total of x, w, y and z is 3 to 500, preferably 5 to 300, further preferably 10 to 200, w' is equal to or larger than w, y' is equal to or larger than y, z' is equal to or larger than z, wherein the parenthesized siloxane units may form a block unit or bond randomly.

In the end-capping step, the compound represented by the formula (7) is reacted with the organic silicon compound represented by the following formula (3) and/or the organic silicon compound represented by the following formula (8) to thereby be end-capped, resulting in the branched organopolysiloxane represented by the formula (10). The end-capping reaction may be conducted as a separate step after the condensation reaction, or the condensation reaction and the end-capping reaction may be conducted in a one step. The compounds represented by the formula (3) or (8) may be used alone or in combination thereof. The end-capping reaction is conducted in the presence of the aforesaid catalyst, if needed.

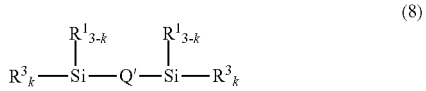

(8)

wherein $R^1$, $R^3$ and k are as defined above and Q' is an oxygen atom, =N—H, or a polysiloxane residue represented by the following formula (9):

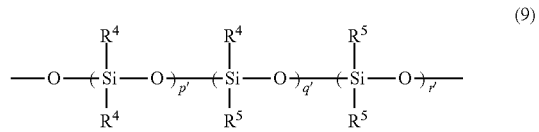

(9)

wherein $R^4$ and $R^5$ are as defined above, p' is an integer of from 0 to 50, q' is an integer of from 0 to 50, r' is an integer of from 0 to 25, a total of p', q' and r' is 1 or more, w' is equal to or larger than p', y' is equal to or larger than q', z' is equal to or larger than r'.

In the aforesaid formulas, $R^1$ and $R^2$ are as defined above for the compound represented by formula (1). $R^3$ is, independently of each other, a hydrogen atom or an alkenyl group having 2 to 10 carbon atoms. Examples of the alkenyl group are as defined in the first aspect. $R^6$ is selected from the afore-mentioned groups defined for $R^1$ and $R^3$. Among these, a hydrogen atom, a methyl group and a vinyl group are preferred.

In the aforesaid formulas, $R^4$ is, independently of each other, the afore-mentioned group defined for $R^3$ or a substituted or unsubstituted, saturated hydrocarbon group having 1 to 12 carbon atoms. Examples of the substituted or unsubstituted, saturated hydrocarbon group include alkyl groups such as a methyl group, an ethyl group, a propyl group, a butyl group, and an octyl group, and cycloalkyl groups such as a cyclopentyl group and a cyclohexyl group; and those hydrocarbon groups wherein a part or all of the hydrogen atoms bonded to the carbon atoms are substituted with a substituent such as a halogen atom such as a fluorine atom, a bromine atom and a chlorine atom, a cyano group, a glycidoxy group, a methacryloyloxy group, a mercapto group or an amino group, e.g., halogen-substituted monovalent hydrocarbon groups such as trifluoropropyl and chloropropyl groups, cyanoalkyl groups such as a β-cyanoethyl group and a γ-cyanopropyl group, 3-methacryloxypropyl group, 3-glycidyloxypropyl group, 3-mercaptopropyl group, and 3-aminopropyl group. Among these, a methyl group and a cyclohexyl group are preferred, a methyl group is further preferred.

In the aforesaid formulas, $R^5$ is, independently of each other, the afore-mentioned group defined for $R^3$ or a substituted or unsubstituted, aromatic hydrocarbon group having 6 to 12 carbon atoms. Examples of the substituted or unsubstituted, aromatic hydrocarbon group include aryl groups such as a phenyl group, a tolyl group and a naphthyl group, and aralkyl groups such as a benzyl group, a phenylethyl group and a phenylpropyl group; and those hydrocarbon groups wherein a part or all of the hydrogen atoms bonded to the carbon atoms are substituted with a substituent such as a halogen atom such as a fluorine atom, a bromine atom and a chlorine atom, a cyano group. Among these, a phenyl group and a benzyl group are preferred.

$R^3$, i.e. a hydrogen atom and an alkenyl group, may be at the terminal or in the any position of $R^1$, $R^5$ or $R^6$ in the formula (7). Preferred are an organopolysiloxane which has a hydrogen atom or an alkenyl group only at the terminal, and an organopolysiloxane which has hydrogen atoms at the terminal and in the position of $R^6$ in the formula (7).

X is a hydrolyzable group or a halogen atom. Examples of the halogen atom include a chlorine atom and a bromine atom. The hydrolyzable group is represented by —OR. R is preferably a hydrogen atom or an alkyl group having 1 to 6 carbon atoms. Examples of the hydrolyzable group include a hydroxy group, a methoxy group, an ethoxy group and an isopropoxy group. Among these, a chlorine atom, a hydroxy group and a methoxy group are preferred, and a hydroxy group and a methoxy group are further preferred.

Examples of the silicon compound represented by $R^4_2SiX_2$, $R^4R^5SiX_2$ and $R^5_2SiX_2$ include chlorosilanes such as dimethyldichlorosilane, methylphenyldichlorosilane, diphenyldichlorosilane and benzylmethyldichlorosilane; alkoxysilanes such as dimethyldimethoxysilane, methylphenyldimethoxysilane, diphenyldimethoxysilane, benzylmethyldimethoxysilane, dimethyldiethoxysilane, methylphenyldiethoxysilane, diphenyldiethoxysilane and benzylmethyldiethoxysilane; and disilanols such as diphenylsilanediol, benzylmethylsilanediol and dibenzylsilanediol. Among these, dimethyldimethoxysilane, methylphenyldimethoxysilane, diphenyldimethoxysilane and diphenylsilanediol are preferred.

In the aforesaid formula (6), $R^2$ is as described above for the aforesaid formula (1). Among these, $R^2$ is preferably a methyl group. $R^4$ and $R^5$ are as defined above. Among these, $R^2$ is preferably a methyl group or a cyclohexyl group, further preferably a methyl group. $R^4$ is preferably a phenyl group or a benzyl group. p is an integer of from 0 to 200, q is an integer of from 0 to 200, r is an integer of from 0 to 50, a total of p, q and r is 2 to 400. p is preferably an integer of from 1 to 50, further preferably 1 to 10, q is preferably an integer of from 1 to 50, further preferably 1 to 10, r is preferably an integer of from 0 to 25, further preferably 0 to 10, a total of p, q and r is preferably 5 to 200, further preferably 10 to 100.

The organic silicon compound is condensated with the aforesaid compound represented by the formula (1) to easily introduce a sequence of D units in a main chain of the branched organopolysiloxane. The addition-curable organopolysiloxane composition containing the branched organopolysiloxane having a sequence of D units provides a cured product having an improved crack resistance, compared to the composition containing the organopolysiloxane which does not have a sequence of D units. In particular, when a total of p, q, and r is 10 to 100, the crack resistance is further improved.

Examples of the organic silicon compound represented by the formula (6) include 1,1,3,3-tetramethyl-1,3-dimethoxydisiloxane, 1,1,3,3-tetramethyldisiloxane-1,3-diol, 1,1,3,3,5,5-hexamethyl-1,5-dimethoxytrisiloxane, 1,3,5-tripheny-1,3,5-trimethyl-1,5-dimethoxytrisiloxane, 1,3,5-tripheny-1,3,5-trimethyltrisiloxane-1,5-diol, 1,1,3,3,5,5-hexaphenyl-1,5-dimethoxytrisiloxane, 1,1,3,3,5,5-hexaphenyltrisiloxane-1,5-diol, and 1,3,5-tri(trifluoropropyl)-1,3,5-trimethyltrisiloxane-1,5-diol, and oligomers or polymers of those compounds.

Examples of the organopolysiloxane represented by the formula (7) include condensation copolymers of a compound selected from the group consisting of 1,1-diphenyl-1,3-dimethyl-3,3-dimethoxydisiloxane, 1,1-diphenyl-1,3-dimethyl-3,3-diethoxydisiloxane, 1,1-diphenyl-1-methyl-3-phenyl-3,3-dimethoxydisiloxane, 1,1,1-triphenyl-3-methyl-3,3-dimethoxydisiloxane, 1,1,1-triphenyl-3-phenyl-3,3-dimethoxydisiloxane, 1,1-diphenyl-1,3,3,5-tetramethyl-5,5-dimethoxytrisiloxane, 1,1-diphenyl-1-methyl-3,3-diphenyl-5-methyl-5,5-dimethoxytrisiloxane, 1,1-diphenyl-1-methyl-3,5,7-triphenyl-3,5,7-trimethyl-9-methyl-9,9-dimet hoxypentasiloxane, 1,1-diphenyl-1-methyl-3,5,7-tri(3,3,3-trifluoropropyl)-3,5,7-trimethyl-9-methyl-9,9-dimethoxypentasiloxane, and 1,1-diphenyl-1-methyl-3-(3,3,3-trifluoropropyl)-3,3-dimethoxydisiloxane, with or more organic silicon compounds selected from the group consisting of the aforesaid organic silicon compounds represented by $R^4{}_2SiX_2$, $R^4R^5SiX_2$ or $R^5{}_2SiX_2$ and the aforesaid organic silicon compound represented by the formula (6).

Examples of the silicon compound represented by formula (8) include disiloxanes such as 1,1,3,3-tetramethyldisiloxane, 1,3-diphenyl-1,3-dimethyldisiloxane, 1,1,3,3-tetraphenyldisiloxane, 1,3-divinyl-1,1,3,3-tetramethyldisiloxane, 1,1,3,3-tetravinyl-1,3-dimethyldisiloxane, hexavinyldisiloxane, and 1,3-dimethyl-1,3-diphenyl-1,3-divinyldisiloxane; silazanes such as 1,1,3,3-tetramethyldisilazane, 1,3-diphenyl-1,3-dimethyldisilazane, 1,1,3,3-tetraphenyldisilazane, 1,3-divinyl-1,1,3,3-tetramethyldisilazane, 1,1,3,3-tetravinyl-1,3-dimethyldisilazane, hexavinyldisilazane and 1,3-dimethyl-1,3-diphenyl-1,3-divinyldisilazane; and siloxane oligomers and polymers such as 1,1,3,3,5,5-hexamethyltrisiloxane, 1,5-divinyl-1,1,3,3,5,5-hexamethyltrisiloxane, 1,1,3,3,5,5,7,7,9,9-decamethylpentasiloxane, 1,9-divinyl-1,1,3,3,5,5,7,7,9,9-decamethylpentasiloxane, 1,1,3,5,5-pentamethyl-3-phenyltrisiloxane, 1,5-divinyl-1,1,3,5,5-pentamethyl-3-phenyltrisiloxane, 1,1,3,5,7,9,9-heptamethyl-3,5,7-triphenylpentasiloxane, 1,9-divinyl-1,1,3,5,7,9,9-heptamethyl-3,5,7-triphenylpentasiloxane, 1,1,5,5-tetramethyl-3,3-diphenyltrisiloxane, 1,5-divinyl-1,1,5,5-tetramethyl-3,3-diphenyltrisiloxane, 1,5-dimethyl-1,3,3,5-tetraphenyltrisiloxane, 1,5-divinyl-1,5-dimethyl-1,3,3,5-tetraphenyltrisiloxane, 1,1,9,9-tetramethyl-3,3,5,5,7,7-hexaphenylpentasiloxane, and 1,9-divinyl-1,1,9,9-tetramethyl-3,3,5,5,7,7-hexaphenylpentasiloxane. Among these, 1,1,3,3-tetramethyldisilazane and 1,3-divinyl-1,1,3,3-tetramethyldisiloxane are preferred.

(3) The Preparation Method in the Second Aspect

The third aspect of the present invention provides a method for preparing the branched organopolysiloxane represented by the following formula (11):

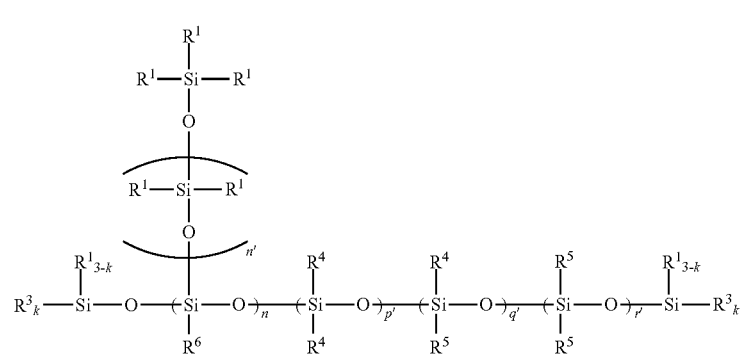

(11)

wherein $R^1$ is, independently of each other, a substituted or unsubstituted, saturated hydrocarbon group having 1 to 12 carbon atoms or a substituted or unsubstituted, aromatic hydrocarbon group having 6 to 12 carbon atoms, $R^3$ is, independently of each other, a hydrogen atom or an alkenyl group having 2 to 10 carbon atoms, $R^4$ is, independently of each other, the afore-mentioned groups defined for $R^3$ or a substituted or unsubstituted, saturated hydrocarbon group having 1 to 12 carbon atoms, $R^5$ is, independently of each other, the afore-mentioned groups defined for $R^3$ or a substituted or unsubstituted, aromatic hydrocarbon group having 6 to 12 carbon atoms, $R^6$ is selected from the afore-mentioned groups defined for $R^1$ and $R^3$, n' is an integer of from 0 to 3, preferably 0 or 1, further preferably 0, k is an integer of from 0 to 3, n is an integer of from 3 to 100, p' is an integer of from 0 to 50, q' is an integer of from 0 to 50, r' is an integer of from 0 to 25, a total of p', q' and r' is 1 or more, a total of n, p', q' and r' is 5 to 200, wherein the parenthesized siloxane units may form a block unit or bond randomly.

The method for preparation in the third aspect includes the condensation step and the end-capping step.

In the condensation step, the aforesaid compound represented by the formula (1) is subjected to a condensation reaction, preferably in the presence of the catalyst, to thereby prepare the organopolysiloxane represented by the following formula (2). In the end-capping step, the compound represented by the formula (2) is reacted with the organic silicon compound represented by the following formula (13) to thereby be end-capped, resulting in the branched organopolysiloxane represented by the formula (11). The end-capping reaction may be conducted as a separate step after the condensation reaction, or the condensation reaction and the end-capping reaction may be conducted in a one step. The end-capping reaction is conducted in the presence of the aforesaid catalyst, if needed.

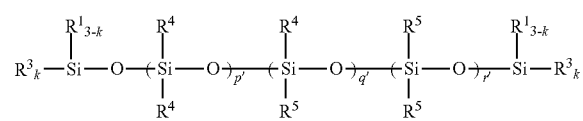

(13)

wherein $R^1$, $R^2$, $R^3$, $R^4$, $R^5$, k, p', q' and r' are as defined above.

In the aforesaid formulas (11) and (13), $R^1$ and $R^2$ are as defined above for the compound represented by the formula (1). $R^3$ and $R^6$ are as described above in the first aspect of the present invention, and $R^1$ and $R^5$ are as described above in the second aspect of the present invention. The group selected for $R^3$, i.e. a hydrogen atom and an alkenyl group, may be at a terminal or in the any position of $R^4$, $R^5$ or $R^6$ in the aforesaid formula (11). Preferred are a branched organopolysiloxane which has a hydrogen atom or an alkenyl group only at the terminal, and a branched organop- olysiloxane which has hydrogen atoms at the terminal and in the position of $R^6$ in the aforesaid formula (11).

The present branched organopolysiloxane is particularly that represented by the following formula (12). This organopolysiloxane may be prepared by the aforesaid second or third aspect of the present invention.

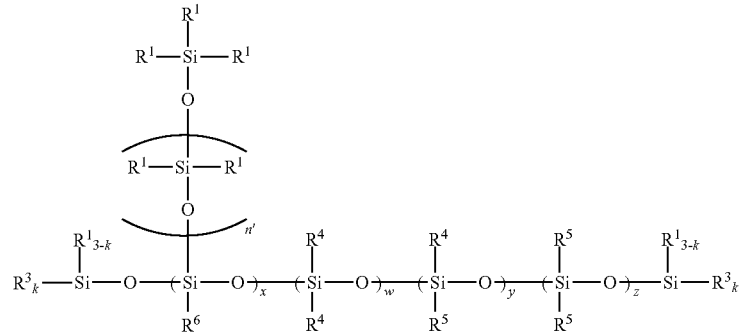

(12)

wherein $R^1$, $R^3$, $R^4$, $R^5$, $R^6$, n', x, w, y, and z are as defined above, x is an integer of from 1 to 100, w is an integer of from 0 to 300, y is an integer of from 0 to 300, z is an integer of from 0 to 100, a total of x, w, y and z is 3 to 500, wherein the parenthesized siloxane units may form a block unit or bond randomly.

4. Common Matters Among the First, Second and Third Aspects of the Present Invention Will be Described Below in Detail.

The aforesaid condensation reaction may be carried out in the presence of at least one solvent. The solvent is used to control a reaction rate and a conversion, or used as a diluent for a condensate obtained. The solvent may be one or more selected from non-polar solvents and polar solvents. Examples of the non-polar solvents include hydrocarbons such as n-hexane, n-heptane and isooctane; aromatic hydrocarbons such as toluene and xylene. Examples of the polar solvents include water; alcohols such as methanol, ethanol and isopropanol; alcohol esters; ketones such as acetone, methylethylketone and cyclohexanone; ethers such as diethyl ether and dibutyl ether; esters such as ethyl acetate, isopropyl acetate and butyl acetate; cyano group-substituted hydrocarbons such as acetonitrile; amines; amides such as acetamide; halogenated hydrocarbons such as methylene chloride, chloroform and hexafluoromethaxylene; and sulfur-containing compounds such as dimethylsulfoxide. An amount of the solvent is not particularly limited and may properly be controlled. Generally, the amount is such that a concentration of the organic silicon compound(s) to be condensated is 5 to 95 mass %, preferably 20 to 80 mass %. These reactions may also be conducted without any solvent.

Any other component may be added in the condensation reaction step as long as the condensation reaction is not obstructed. For instance, a neutral surfactant may be added in order to improve dispersibility of a solid catalyst. When $R^2$ in the aforesaid compounds represented by the formulas (1) to (7) has reactivity, a reaction inhibitor may be added. These may be used alone or in combination thereof. An amount of the other component may be such as not to obstruct the effects of the present invention.

The aforesaid condensation may be conducted with heating. The reaction temperature is preferably 0 to 160 degrees C., further preferably 60 to 100 degrees C. The reaction time may be selected properly.

The present method further comprises a step of filtration to remove a catalyst after the reaction, preferably after the condensation step. Where the condensation reaction and the end-capping reaction is conducted in a one step, the catalyst may be filtrated off after the end-capping reaction. In the afore-mentioned method, the catalyst can be easily removed from the reaction product. In the filtration, the aforesaid solvent may be added in order to control a viscosity of the reaction mixture. The present method may further comprise a step of purification in any known manner, such as washing with water, stripping at a reduced pressure, and treatment with activated carbon, in order to remove any unreacted monomers from the reaction product.

The end-capping reaction may be conducted in the presence of the aforesaid catalyst or the absence of any catalyst. When a chlorosilane compound is used as the organic silane compound represented by the aforesaid formula (3) and the reaction is conducted in the presence of water, a catalyst need not to be added because hydrochloric acid which occurs in the reaction works as a catalyst. The catalyst may be properly selected from the aforesaid catalysts and may be same as one used in the condensation reaction. Alternatively, the catalyst used in the condensation reaction may be removed with filtration and a different catalyst may be used in the end-capping reaction.

When a chlorosilane compound is used as the organic silane compound represented by the aforesaid formula (3), it is preferred that an acid acceptor is added in order to neutralize hydrogen chloride which occurs in the reaction and, then, the hydrogen chloride is removed from the product. Examples of the acid acceptor include alkylamines such as trimethylamine and triethylamine; nitrogen-containing heterocyclic compounds such as pyridine and piperazine; cyclic diamines such as 1,4-diazabicyclo[2.2.2]octane (DABCO) and 1,8-diazabicyclo[5.4.0]-7-undecene (DBU); silazanes such as 1,3-divinyl-1,1,3,3,-tetramethyldisilazane, 1,1,3,3-tetravinyl-1,3-dimethyldisilazane, hexavinyldisilazane and 1,3-dimethyl-1,3-diphenyl-1,3-divinyldisilazane; and an inorganic acid acceptor such as magnesium hydroxide, magnesium oxide and sodium hydrogencarbonate. Among these, triethylamine, pyridine and magnesium oxide are preferred.

The aforesaid end-capping reaction may be carried out in the presence of at least one solvent. The solvent is used to control a reaction rate and a conversion, or used as a diluent for a condensate obtained. The solvent may be one or more selected from non-polar solvents and polar solvents. The solvent may be the same as the solvent used in the aforesaid condensation reaction. Where the condensation reaction and the end-capping reaction are conducted in two steps, the solvent used in the condensation reaction can be used further in the end-capping reaction without being removed. Examples of the solvents are those described above for the condensation reaction. An amount of the solvent is not particularly limited and may properly be controlled. Generally, the amount is such that a concentration of the organic silicon compound to be end-capped is 5 to 95 mass %, preferably 20 to 80 mass %. The end-capping reaction may be conducted without any solvent.

The temperature for the end-capping reaction is preferably 0 to 100 degrees C., further preferably 20 to 80 degrees C. When the condensation and end-capping reaction are conducted in a one step, the reaction temperature may be 0 to 160 degrees C., preferable 20 to 80 degrees C. The reaction time may be selected properly.

The aforesaid method may further comprise a step of purification in known manners, such as washing with water, stripping at a reduced pressure, and treatment with an activated carbon, in order to remove an unreacted monomer from the reaction product. In particular, when the acid acceptor is used, a hydrochloride salt with the acid acceptor occurs. It is preferred to remove the hydrochloride salt in a known manner such as filtration, washing with water, and treatment with an activated carbon. In particular, amine hydrochloride sometimes promotes breakage of a siloxane bond or works as a catalytic poison to hydrosilylation. Therefore, the amine hydrochloride is preferably removed from the reaction product as much as possible when such acid acceptor is used in the preparation of the addition-curable organopolysiloxane composition.

In the present method, formation of a by-produced cyclic polysiloxanes is suppressed. In particular, a ratio of an amount of cyclic polysiloxanes by which the branched organopolysiloxane is accompanied to a total amount of the polysiloxanes may be made so small as 10% or less, as determined in areas of their spectra in a GPC chart. On account of the fact that the amount of the cyclic polysiloxanes by which the branched organopolysiloxane is accompanied is made smaller, when a cured product of the composition comprising the branched organopolysiloxane is used as an encapsulating material, contamination of adjacent members with the cyclic polysiloxanes by bleeding is prevented.

EXAMPLES

The present invention will be explained below in further detail with reference to a series of the Examples and the Comparative Examples, though the present invention is in no way limited by these Examples.

In the following descriptions, the weight average molecular weight (Mw) was determined by gel permeation chromatography, i.e., GPC, and reduced to polystyrene. Conditions in the GPC were as follows.
[GPC Conditions]
Solvent: Tetrahydrofuran
Flow rate: 0.6 mL/min.
Columns: all provided by TOSOH Cop.
TSK Guardcolumn SuperH-L
TSKgel SuperH4000 (6.0 mmI.D.×15 cm×1)
TSKgel SuperH3000 (6.0 mmI.D.×15 cm×1)
TSKgel SuperH2000 (6.0 mmI.D.×15 cm×2)
Column Temperature: 40 degrees C.
Injection Volume: 20 micro liters of a 0.5% by weight solution in THF.
Detector: Differential refractive index detector (RI)
The $^1$H-NMR spectra were obtained with ULTRA-SHIELD™ 400PLUS, ex BRUKER Corporation. $^{29}$Si-NMR spectra were obtained with RESONANCE500, ex JEOL Ltd.

In the following synthesis examples 1 to 3, compounds represented by the aforesaid formula (1) were prepared.

Synthesis Example 1

Figure 2:
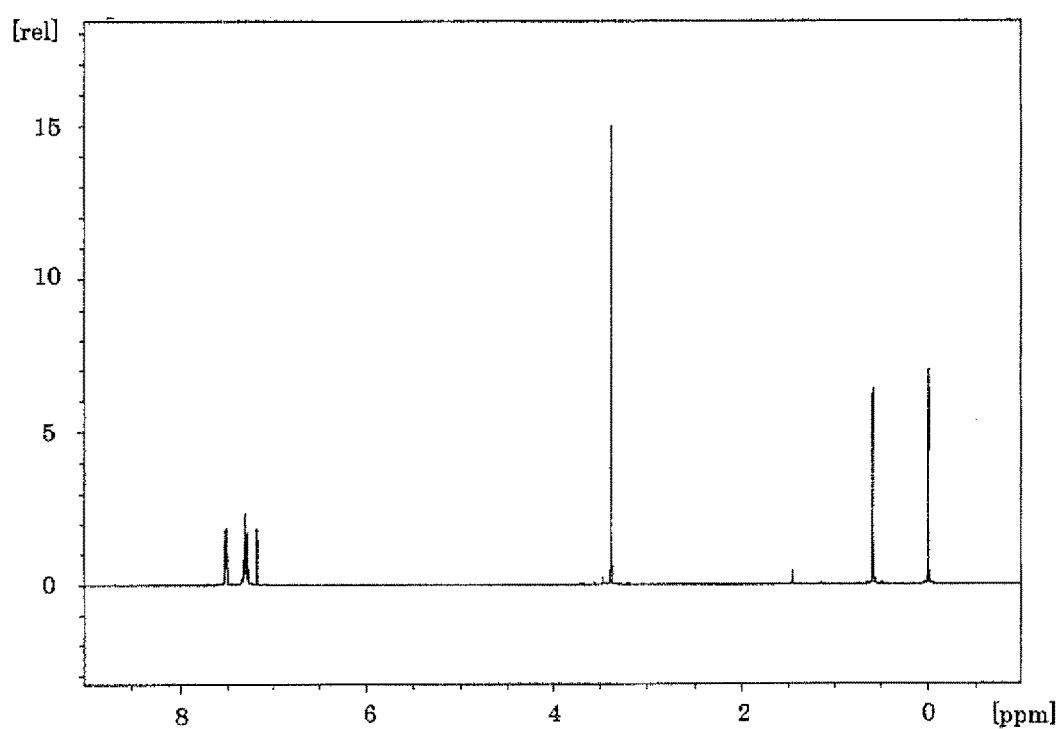
FIG. 2 is a chart of $^1$H-NMR of the organosiloxane prepared in Synthesis Example 1.

230.33 Grams (1 mol) of diphenylmethylsilanol and 408.68 grams (3 mols) of methyltrimethoxysilane were mixed and heated to 60 degrees C. under stirring. 5.31 Grams of $Sr(OH)_2.8H_2O$, catalyst, were added to the mixture and, then, these compounds were reacted at 60 degrees C. for 3 hours. The catalyst was removed from the reaction mixture by filtration and, then, unreacted methyltrimethoxysilane was distilled off from the mixture at a reduced pressure. The product was analyzed by 1H-NMR to find that it was an organosiloxane represented by the following formula (14). The yield was 99.9% and its Mw was 361. The purity of the organosiloxane was 95% by mass. The GPC chart of the organosiloxane is shown in FIG. 1. The integrated values of the ¹H-NMR spectra were as follows. The determination solvent in the ¹H-NMR was deuterated chloroform. The ¹H-NMR spectra is shown in FIG. 2. —C$\underline{H}_3$:6.0 (−0.3 to 0.3 ppm), —OC$\underline{H}_3$:5.9 (3.3 to 3.8 ppm), —C$_6$$\underline{H}_5$:10.1 (7.2 to 8.0 ppm)

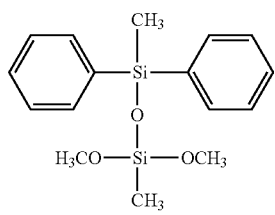

(14)

Synthesis Example 2

230.33 Grams (1 mol) of diphenylmethylsilanol and 594.88 grams (3 mols) of phenyltrimethoxysilane were mixed and heated to 60 degrees C. 4.13 Grams of Sr(OH)$_2$.8H$_2$O were added to the mixture and, then, these compounds were reacted at 60 degrees C. for 3 hours. The catalyst was removed from the reaction mixture by filtration and, then, unreacted phenyltrimethoxysilane was distilled off from the mixture at a reduced pressure. The product was analyzed by ¹H-NMR to find that it was an organosiloxane represented by the following formula (15). The yield was 99.8% and its Mw was 460. The purity of the organosiloxane was 95% by mass. The integrated values of the ¹H-NMR spectra were as follows. The determination solvent in the 1H-NMR was deuterated chloroform.
—C$\underline{H}_3$:3.0 (−0.3 to 0.3 ppm), —OC$\underline{H}_3$:5.9 (3.3 to 3.8 ppm), —C$_6$$\underline{H}_5$:15.0 (7.2 to 8.0 ppm)

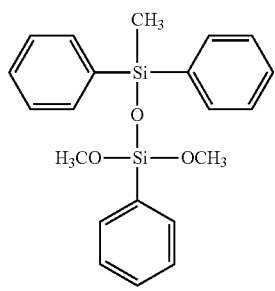

(15)

Synthesis Example 3

261.31 Grams (1 mol) of diphenylsilanediol and 274.03 grams (1.1 mols) of diphenylmethylmethoxysilane (DPMMS) were mixed and cooled to 10 degrees C. 4.90 Grams of Ba(OH)$_2$.8H$_2$O were added to the mixture and, then, these compounds were reacted at 10 degrees C. for 6 hours. The catalyst was removed from the reaction mixture by filtration and, then, unreacted diphenylmethylmethoxysilane was distilled off from the mixture at a reduced pressure. 408.68 Grams (3 mols) of methyltrimethoxysilane was added to the mixture obtained, stirred, 4.50 g of Sr(OH)$_2$.8H$_2$O was added to the mixture and, then, these compounds were reacted at 60 degrees C. for 3 hours. The catalyst was removed from the reaction mixture by filtration and, then, unreacted methyltrimethoxysilane was distilled off from the mixture at a reduced pressure. The product was analyzed by ¹H-NMR to find that it was an organosiloxane represented by the following formula (16). The yield was 97.8% and its Mw was 623. The purity of the organosiloxane was 90% by mass. The integrated values of the ¹H-NMR spectra were as follows. The determination solvent in the ¹H-NMR was deuterated chloroform.
—C$\underline{H}_3$:3.0 (−0.3 to 0.3 ppm), —OC$\underline{H}_3$:5.9 (3.3 to 3.8 ppm), —C$_6$$\underline{H}_5$:15.0 (7.2 to 8.0 ppm)

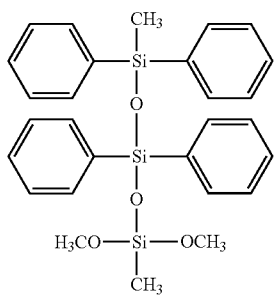

(16)

Synthesis Example 4

230.33 Grams (1 mol) of diphenylmethylsilanol and 242.38 grams (2 mols) of trimethoxysilane were mixed and heated to 40 degrees C. with stirring. 23.6 Grams of Al(OH)$_3$ were added to the mixture and, then, these compounds were reacted at 40 degrees C. for 16 hours. The catalyst was removed from the reaction mixture by filtration and, then, unreacted trimethoxysilane was distilled off from the mixture at a reduced pressure. The product was analyzed by ¹H-NMR to find that it was an organosiloxane represented by the following formula (17). The yield was 99.4% and its Mw was 344. The purity of the organosiloxane was 97% by mass. The integrated values of the ¹H-NMR spectra were as follows. The determination solvent in the ¹H-NMR was deuterated chloroform. —C$\underline{H}_3$:3.0 (−0.3 to 0.3 ppm), —OC$\underline{H}_3$:6.1 (3.3 to 3.8 ppm), Si—H:1.0 (ppm), —C$_6$$\underline{H}_5$:10.1 (7.2 to 8.0 ppm)

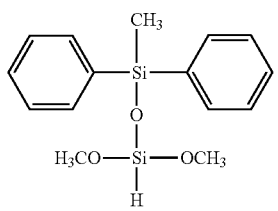

(17)

Synthesis Example 5

230.33 Grams (1 mol) of diphenylmethylsilanol and 444.71 grams (3 mols) of vinyltrimethoxysilane were mixed and heated to 80 degrees C. with stirring. 6.75 Grams of Sr(OH)$_2$.8H$_2$O were added to the mixture and, then, these compounds were reacted at 80 degrees C. for 2 hours. The catalyst was removed from the reaction mixture by filtration and, then, unreacted vinyltrimethoxysilane was distilled off from the mixture at a reduced pressure. The product was analyzed by ¹H-NMR to find that it was an organosiloxane represented by the following formula (18). The yield was 99.8% and its Mw was 392. The purity of the organosiloxane was 96% by mass. The integral values of the ¹H-NMR spectra were as follows. The determination solvent in the ¹H-NMR was deuterated chloroform. —C$\underline{H}_3$:3.0 (−0.3 to 0.3 ppm), —OC$\underline{H}_3$:6.0 (3.3 to 3.8 ppm), —CH—CH$_2$:2.9 (ppm), —C$_6\underline{H}_5$:10.1 (7.2 to 8.0 ppm)

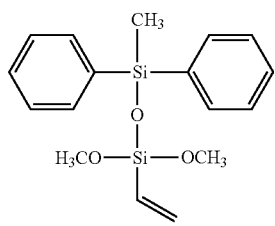

(18)

As shown in the aforesaid Synthesis Examples, triorganosilanol (R$_3$SiOH) and monoorganotrialkoxysilane (RSi(OR)$_3$) are subjected to a condensation reaction in the presence of the aforesaid catalyst to thereby easily provide an organosiloxane having two alkoxy groups bonded to one silicon atom at one terminal with a high purity. Branched organopolysiloxanes were prepared using the compounds prepared in the Synthesis Example 1, 2 or 3 as starting materials.

Example 1

(Preparation Method in the Second Aspect of the Invention)

Figure 3:
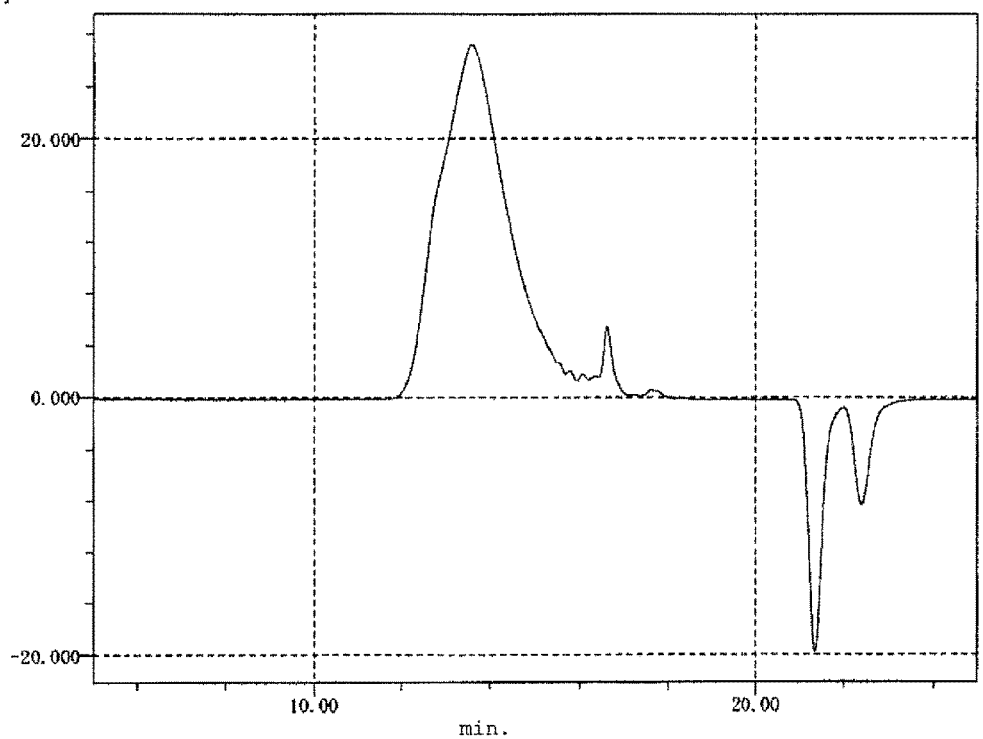
FIG. 3 is a GPC chart of the organopolysiloxane prepared in Example 1.
Figure 4:
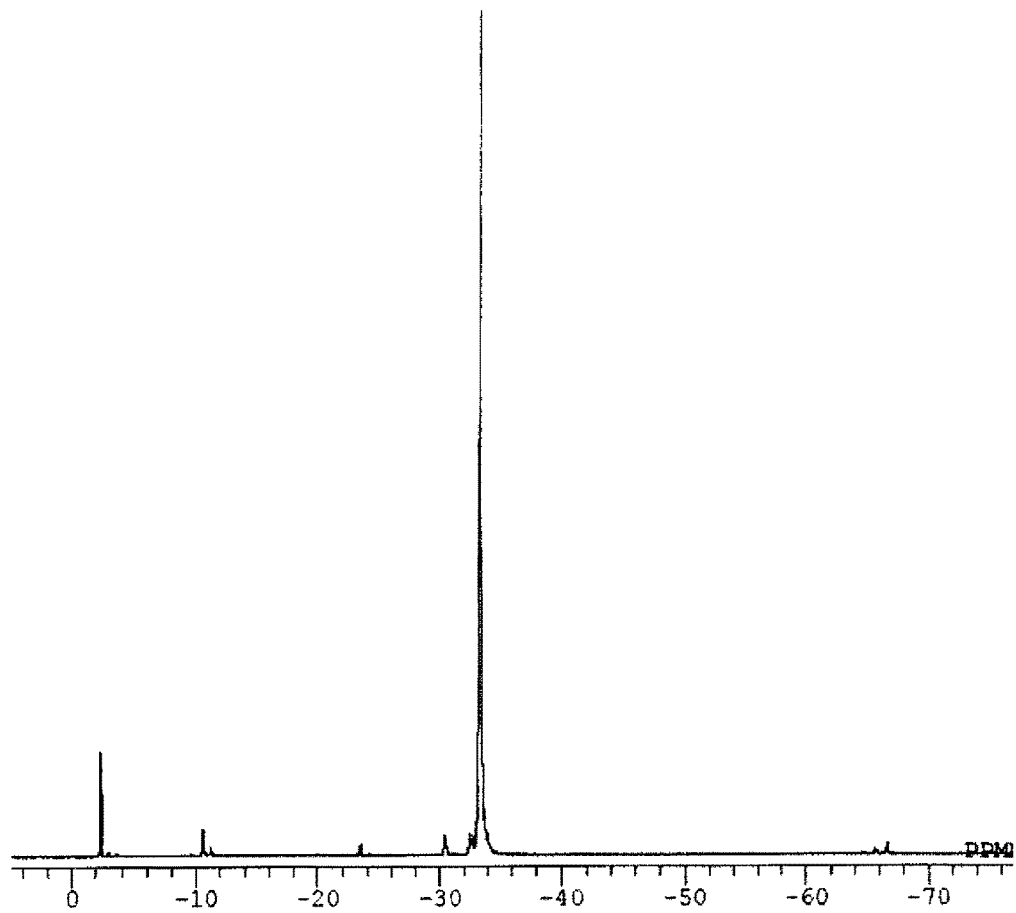
FIG. 4 is a chart of $^{29}$Si-NMR of the organopolysiloxane prepared in Example 1.

63.7 Grams (0.2 mol) of the organosiloxane prepared in Synthesis Example 1, 1198.5 grams (2.23 mols) of polymethylphenylailoxane-α,ω-diol, Mw=537.43, as the aforesaid compound represented by the formula (6), and 48.82 grams (0.42 mol) of dimethylvinylmethoxysilane, as the aforesaid compound represented by the formula (3), were mixed and heated to 60 degrees C. under stirring. 3.15 Grams of Sr(OH) 28H$_2$O were added to the mixture and, then, these compounds were reacted at 60 degrees C. for 3 hours. The catalyst was removed from the reaction mixture by filtration and, then, methanol and water were distilled off from the mixture at a reduced pressure to obtain an oily branched organopolysiloxane represented by the following formula, hereinafter referred to as organopolysiloxane 1. Its Mw was 5729. The GPC chart of the organopolysiloxane is shown in FIG. 3. The ²⁹Si-NMR spectra is shown in FIG. 4. The determination solvent was deuterated chloroform. The integrated values and the chemical shift of the ²⁹Si-NMR were as shown in Table 1. This branched organopolysiloxane was accompanied by a cyclic polysiloxane having a peak in the range of 15.5 to 18.0 min. in the GPC chart. A ratio of the area for the cyclic polysiloxane to the total area for the organopolysiloxane obtained, in the GPC chart, was 5.5%.

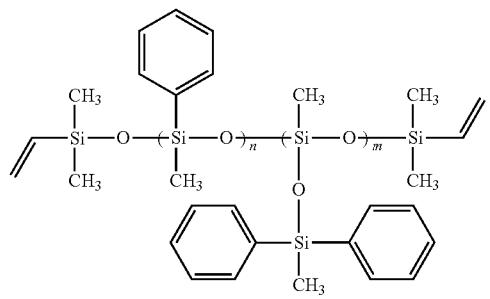

wherein n was 37 and m was 1.1, both on average.

Example 2

(Preparation Method in the Second Aspect of the Invention)

79.63 Grams (0.25 mol) of the organosiloxane prepared in Synthesis Example 1, 115.01 grams (0.214 mol) of polymethylphenylsiloxane-α,ω-diol, Mw=537.43, as the aforesaid compound represented by the formula (6), and 1.22 grams (0.0105 mol) of dimethylvinylmethoxysilane, as the aforesaid compound represented by the formula (3), were mixed and heated to 60 degrees C. 5.88 Grams of Sr(OH)$_2$.8H$_2$O and 18 grams of water were added to the mixture and, then, these compounds were reacted at 60 degrees C. for 3 hours. Subsequently, these compounds were reacted at 80 degrees C. for 3 hours while distilling generated methanol off, further reacted at 120 degrees C. for 3 hours while distilling water off and, then, reacted at 160 degrees C. for 24 hours. The catalyst was removed from the reaction mixture by filtration and, then, methanol and water were distilled off from the mixture at a reduced pressure to obtain an oily branched organopolysiloxane represented by the following formula, hereinafter referred to as organopolysiloxane 2. Its Mw was 34,502. The integrated values and the chemical shift of the ²⁹Si-NMR are as shown in Table 1. The determination solvent was deuterated chloroform. This branched organopolysiloxane was accompanied by a cyclic polysiloxane having a peak in the range of 15.5 to 18.0 min. in the GPC chart. A ratio of the area for the cyclic polysiloxane to the total area for the organopolysiloxane obtained, in the GPC chart, was 5.8%.

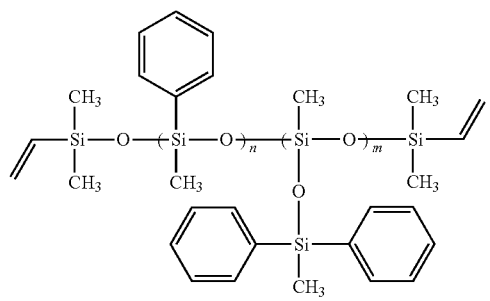

wherein n was 150 and m was 51, both on average.

Example 3

(Preparation Method in the Second Aspect of the Invention)

79.63 Grams (0.25 mol) of the organosiloxane prepared in Synthesis Example 1 and 134.36 grams (0.25 mol) of polymethylphenylsiloxane-α,ω-diol, Mw=537.43, as the aforesaid compound represented by the formula (6), were mixed and heated to 80 degrees C. 10.70 Grams of Sr(OH)$_2$.8H$_2$O were added to the mixture and, then, these compounds were reacted at 80 degrees C. for 24 hours while distilling generated methanol off. Then, 21.4 grams of water were added to the mixture and these compounds were reacted at 100 degrees C. for 24 hours with refluxing. The catalyst was removed from the reaction mixture by filtration and, then, methanol and water were distilled off from the mixture at a reduced pressure to obtain an oily branched organopolysiloxane represented by the following formula, hereinafter referred to as organopolysiloxane 3, corresponding to the aforesaid compound represented by the formula (7). Its Mw was 10,485. The integrated values and the chemical shift of the 29Si-NMR were as shown in Table 1. The determination solvent was deuterated chloroform. This branched organopolysiloxane was accompanied by a cyclic polysiloxane having a peak in the range of 15.5 to 18.0 min. in the GPC chart. A ratio of the area for the cyclic polysiloxane to the total area for the organopolysiloxane obtained, in the GPC chart, was 5.7%.

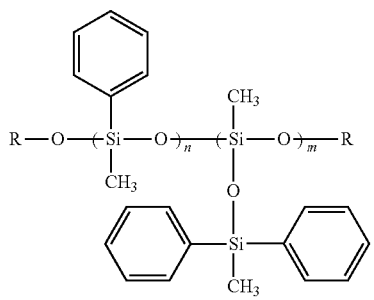

wherein R was H or CH$_3$, and n was 52 and m was 12, both on average.

250 Grams of toluene were added to 1087.7 grams (0.1 mol) of the organopolysiloxane 3 and mixed sufficiently. 28.38 Grams (0.3 mol) of dimethylchlorosilane, as the aforesaid compound represented by the formula (3), were added dropwise in the mixture at 25 degrees C. and stirred for 30 minutes. Then, 6.5 grams of water were added dropwise in the mixture and these compounds were reacted at 40 degrees C. for 8 hours. The reaction mixture was washed with water and, then, subjected to azeotropic dehydration, and the solvent was distilled off from the mixture to obtain an oily branched organopolysiloxane represented by the following formula, hereinafter referred to as organopolysiloxane 4. Its Mw was 10,690. The integrated values and the chemical shift of the 29Si-NMR were as shown in Table 1. The determination solvent was deuterated chloroform. This branched organopolysiloxane was accompanied by a cyclic polysiloxane having a peak in the range of 15.5 to 18.0 min. in the GPC chart. A ratio of the area for the cyclic polysiloxane to the total area for the organopolysiloxane obtained, in the GPC chart, was 5.7%. In this preparation, no catalyst was added because hydrochloric acid generated in a reaction between dimethylchlorosilane and water worked as a catalyst.

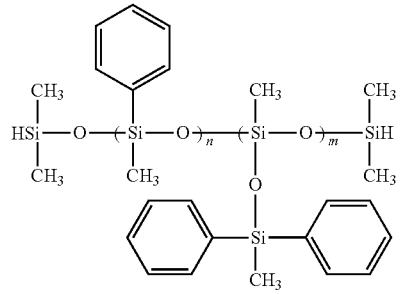

wherein n was 52 and m was 12, both on average.

Example 4

(Preparation Method for in the First Aspect of the Invention)

43.2 Grams of water was added to 396.62 Grams (1 mol) of the organosiloxane prepared in Synthesis Example 2 and, then, 3.19 grams of Sr(OH)$_2$.8H$_2$O were added thereto with stirring. Then, the mixture was allowed to react at 80 degrees C. for 12 hours, while distilling generated methanol off. The catalyst was removed from the reaction mixture by filtration and, then, methanol and water were distilled off from the mixture at a reduced pressure to obtain an oily branched organopolysiloxane represented by the following formula, hereinafter referred to as organopolysiloxane 5, corresponding to the aforesaid compound represented by the formula (2). Its Mw was 4,626. The integrated values and the chemical shift of the $^{29}$Si-NMR are as shown in Table 1. The determination solvent was deuterated chloroform. This branched organopolysiloxane was accompanied by a cyclic polysiloxane having a peak in the range of 15.5 to 18.0 min. in the GPC chart. A ratio of the area for the cyclic polysiloxane to the total area for the organopolysiloxane obtained, in the GPC chart, was 7.2%.

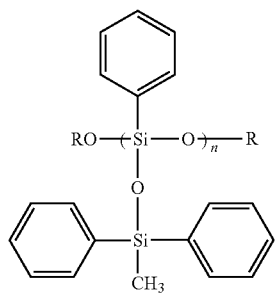

wherein R was H or CH$_3$, and n was 13, both on average.

5.1 Grams of dimethylvinylsilanol, as the aforesaid compound represented by the formula (3), were added to 46.3 grams (0.01 mol) of the organopolysiloxane 5 obtained in the aforesaid preparation and, then, 0.05 gram of Ba(OH)$_2$.8H$_2$O were added thereto with stirring. Then, the mixture was allowed to react at 80 degrees C. for 12 hours, while distilling generated methanol off. The catalyst was removed from the reaction mixture by filtration and, then, methanol and unreacted dimethylvinylsilanol were distilled off from the mixture at a reduced pressure to obtain an oily branched organopolysiloxane represented by the following formula, hereinafter referred to as organopolysiloxane 6. Its Mw was 4,822. The integrated values and the chemical shift of the $^{29}$Si-NMR are as shown in Table 1. This branched organopolysiloxane was accompanied by a cyclic polysiloxane having a peak in the range of 15.5 to 18.0 min. in the GPC chart. A ratio of the area for the cyclic polysiloxane to the total area for the organopolysiloxane obtained, in the GPC chart, was 7.2%.

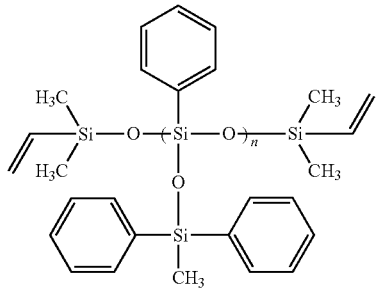

wherein n was 13, on average.

Example 5

(Preparation Method in the Second Aspect of the Invention)

31.85 Grams (0.1 mol) of the organosiloxane prepared in Synthesis Example 1, 74.90 grams (0.05 mol) of polydimethylsiloxane-α,ω-diol, Mw=1,498, as the aforesaid compound represented by the formula (6), and 6.97 grams (0.06 mol) of dimethylvinylmethoxysilane, as the aforesaid compound represented by the formula (3) were mixed and heated to 80 degrees C. with stirring. 0.6 Gram of $Sr(OH)_2 \cdot 8H_2O$ were added to the mixture and, then, these compounds were reacted at 80 degrees C. for 12 hours, while distilling generated methanol off. The catalyst was removed from the reaction mixture by filtration and, then, methanol and water were distilled off from the mixture at a reduced pressure to obtain an oily branched organopolysiloxane represented by the following formula, hereinafter referred to as organopolysiloxane 7. Its Mw was 4,520. The integrated values and the chemical shift of the $^{29}$Si-NMR are as shown in Table 1. The determination solvent was deuterated chloroform. This branched organopolysiloxane was accompanied by a cyclic polysiloxane having a peak in the range of 15.5 to 18.0 min. in the GPC chart. A ratio of the area for the cyclic polysiloxane to the total area for the organopolysiloxane obtained, in the GPC chart, was 3.2%.

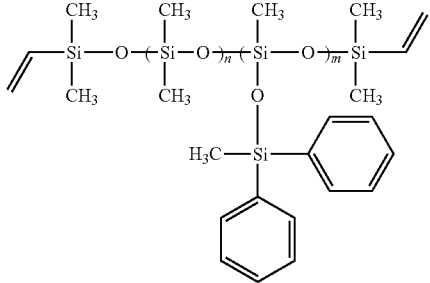

wherein n was 41 and m was 4, both on average.

Example 6

(Preparation Method in the Third Aspect of the Invention)

31.85 Grams (0.1 mol) of the organosiloxane prepared in Synthesis Example 1 and 85.5 grams (0.05 mol) of both-terminals vinyl group-containing polydimethylsiloxane, Mw-1,710, as the aforesaid compound represented by the formula (13), were mixed and heated to 80 degrees C. with stirring. 1.2 Grams of $Sr(OH)_2 \cdot 8H_2O$ were added to the mixture and, then, these compounds were reacted at 80 degrees C. for 12 hours, while distilling generated methanol off and, then reacted at 120 degrees C. for 12 hours. The catalyst was removed from the reaction mixture by filtration to obtain an oily branched organopolysiloxane represented by the following formula, hereinafter referred to as organopolysiloxane B. Its Mw was 4,540. The integrated values and the chemical shift of the $^{29}$Si-NMR are as shown in Table 2. This branched organopolysiloxane was accompanied by a cyclic polysiloxane having a peak in the range of 15.5 to 18.0 min. in the GPC chart. A ratio of the area for the cyclic polysiloxane to the total area for the organopolysiloxane obtained, in the GPC chart, was 3.3%.

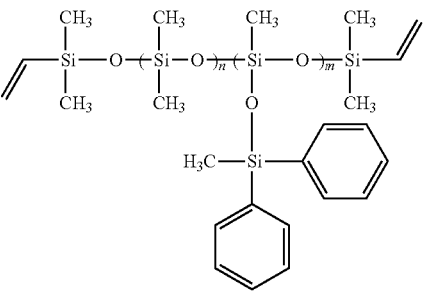

wherein n was 41 and m was 4, both on average.

Example 7

(Preparation Method in the Third Aspect of the Invention)

31.85 Grams (0.1 mol) of the organosiloxane prepared in Synthesis Example 1, 120.23 grams (1.0 mol) of dimethyldimethoxysilane as the compound represented by $R^4{}_2SiX_2$, 6.03 grams (0.05 mol) of vinyldimethylchlorosilane, as the aforesaid compound represented by the formula (3), and 100 grams of toluene were mixed. 100 Grams of 5M solution of hydrochloric acid was added to the mixture with stirring and, then, these compounds were reacted for 6 hours. The reaction product was washed with pure water and the water and toluene were distilled off from the mixture at a reduced pressure to obtain an oily branched organopolysiloxane represented by the following formula, hereinafter referred to as organopolysiloxane 9. Its Mw was 5,062. The integrated values and the chemical shift of the $^{29}$Si-NMR are as shown in Table 2. The determination solvent was deuterated chloroform. This branched organopolysiloxane was accompanied by a cyclic polysiloxane having a peak in the range of 15.5 to 18.0 min. in the GPC chart. A ratio of the area for the cyclic polysiloxane to the total area for the organopolysiloxane obtained, in the GPC chart, was 3.1%.

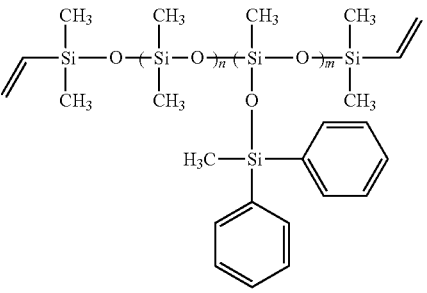

wherein n was 44 and m was 4, both on average.

Example 8B (Preparation Method in the Second Aspect of the Invention)

31.85 Grams (0.1 mol) of the organosiloxane prepared in Synthesis Example 1, 130.4 grams (0.05 mol) of polydimethyldiphenylsiloxane-α,ω-diol, Mw-2,608, having 10 mol % of phenyl groups, as the aforesaid compound represented by the formula (6), and 6.97 grams (0.06 mol) of dimethylvinylmethoxysilane, as the aforesaid compound represented by the formula (3), were mixed and heated to 80 degrees C. with stirring. 1.7 Grams of $Ba(OH)_2 \cdot 8H_2O$ were added to the mixture and, then, these compounds were reacted at 80 degrees C. for 12 hours, while distilling generated methanol off. The catalyst was removed from the reaction mixture by filtration and, then, methanol and water were distilled off from the mixture at a reduced pressure to obtain an oily branched organopolysiloxane represented by the following formula, hereinafter referred to as organopolysiloxane 10. Its Mw was 6,608. The integrated values and the chemical shift of the $^{29}$Si-NMR are as shown in Table 2. The determination solvent was deuterated chloroform. This branched organopolysiloxane was accompanied by a cyclic polysiloxane having a peak in the range of 15.5 to 18.0 min. in the GPC chart. A ratio of the area for the cyclic polysiloxane to the total area for the organopolysiloxane obtained, in the GPC chart, was 4.6%.

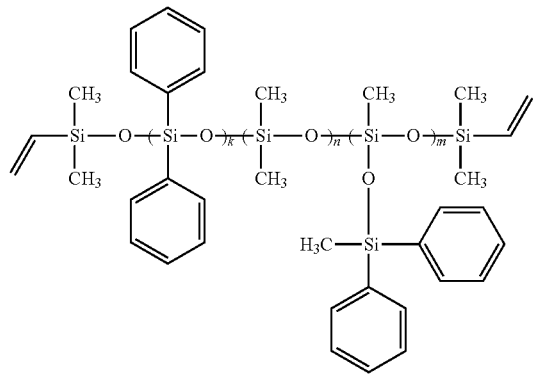

wherein k was 6, n was 53 and m was 4, both on average.

Example 9

(Preparation Method in the Second Aspect of the Invention)

38.05 Grams (0.1 mol) of the organosiloxane prepared in Synthesis Example 2, 74.90 grams (0.05 mol) of polydimethylsiloxane-α,ω-diol, Mw-1,498, as the aforesaid compound represented by the formula (6), and 6.97 grams (0.06 mol) of dimethylvinylmethoxysilane, as the aforesaid compound represented by the formula (3), were mixed and heated to 80 degrees C. with stirring. 1.2 Grams of $Ba(OH)_2 \cdot H_2O$ were added to the mixture and, then, these compounds were reacted at 80 degrees C. for 12 hours, while distilling generated methanol off. The catalyst was removed from the reaction mixture by filtration and, then, methanol and water were distilled off from the mixture at a reduced pressure to obtain an oily branched organopolysiloxane represented by the following formula, hereinafter referred to as organopolysiloxane 11. Its Mw was 7,495. The integrated values and the chemical shift of the $^{29}$Si-NMR are as shown in Table 2. The determination solvent was deuterated chloroform. This branched organopolysiloxane was accompanied by a cyclic polysiloxane having a peak in the range of 15.5 to 18.0 min. in the GPC chart. A ratio of the area for the cyclic polysiloxane to the total area for the organopolysiloxane obtained, in the GPC chart, was 3.9%.

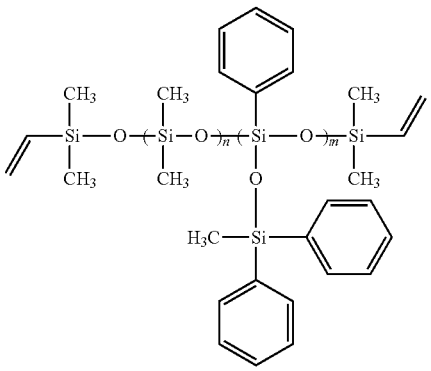

wherein n was 43 and m was 4, both on average.

Example 10

(Preparation Method in the Second Aspect of the Invention)

52.41 Grams (0.1 mol) of the organosiloxane prepared in Synthesis Example 3, 74.90 grams (0.05 mol) of polydimethylsiloxane-α,ω-diol, Mw-1,498, as the aforesaid compound represented by the formula (6), and 6.97 grams (0.06 mol) of dimethylvinylmethoxysilane, as the aforesaid compound represented by the formula (3), were mixed and heated to 80 degrees C. with stirring. 1.2 Grams of $Sr(OH)_2 \cdot 8H_2O$ were added to the mixture and, then, these compounds were reacted at 80 degrees C. for 12 hours, while distilling generated methanol off. The catalyst was removed from the reaction mixture by filtration and, then, methanol and water were distilled off from the mixture at a reduced pressure to obtain an oily branched organopolysiloxane represented by the following formula, hereinafter referred to as organopolysiloxane 12. Its Mw was 5,536. The integrated values and the chemical shift of the $^{29}$Si-NMR are as shown in Table 2. The determination solvent was deuterated chloroform. This branched organopolysiloxane was accompanied by a cyclic polysiloxane having a peak in the range of 15.5 to 18.0 min. in the GPC chart. A ratio of the area for the cyclic polysiloxane to the total area for the organopolysiloxane obtained, in the GPC chart, was 5.2%.

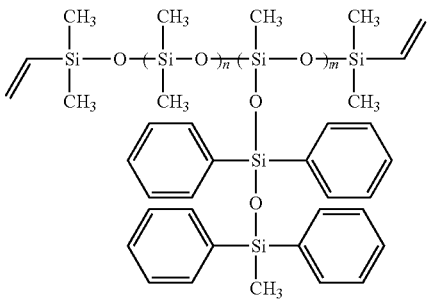

wherein n was 41 and m was 3.8, both on average.

Example 11

(Preparation Method in the Second Aspect of the Invention)

30.45 Grams (0.1 mol) of the organosiloxane prepared in Synthesis Example 4 and 74.90 grams (0.05 mol) of polydimethylsiloxane-α,ω-diol, Mw-1,498, as the aforesaid compound represented by the formula (6), were mixed and heated to 80 degrees C. with stirring. 10.54 Grams of FeO were added to the mixture and, then, these compounds were reacted at 80 degrees C. for 42 hours, while distilling generated methanol off. The catalyst was removed from the reaction mixture by filtration and, then, methanol and water were distilled off from the mixture at a reduced pressure to obtain an oily branched organopolysiloxane represented by the following formula, hereinafter referred to as organopolysiloxane 13, corresponding to the aforesaid compound represented by the formula (7). Its Mw was 3,674. The integrated values and the chemical shift of the $^2$Si-NMR are as shown in Table 2. The determination solvent was deuterated chloroform. This branched organopolysiloxane was accompanied by a cyclic polysiloxane having a peak in the range of 15.5 to 18.0 min. in the GPC chart. A ratio of the area for the cyclic polysiloxane to the total area for the organopolysiloxane obtained, in the GPC chart, was 2.8%.

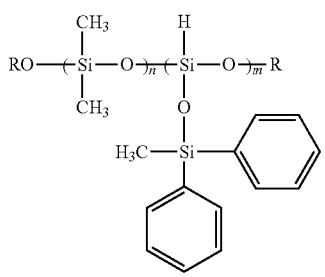

wherein R was H or CH$_3$, and n was 21 and m was 2, both on average.

Grams of toluene were added to 36.74 grams (0.01 mol) of the organopolysiloxane 13 and mixed sufficiently. 2.84 Grams (0.03 mol) of dimethylchlorosilane, as the aforesaid compound represented by the formula (3), were added dropwise in the mixture at 25 degrees C. and stirred for 30 minutes. Then, 1.8 grams of water were added dropwise in the mixture and these compounds were reacted at 40 degrees C. for 8 hours. The reaction product was washed with water and, then, subjected to an azeotropic dehydration and the solvent was distilled off from the mixture to obtain an oily branched organopolysiloxane represented by the following formula, hereinafter referred to as organopolysiloxane 14. Its Mw was 3,852. The integrated values and the chemical shift of the $^{29}$Si-NMR are as shown in Table 2. In this preparation, a catalyst was not used because hydrochloric acid generated from a reaction between dimethylchlorosilane and water during the aforesaid reaction worked as a catalyst. This branched organopolysiloxane was accompanied by a cyclic polysiloxane having a peak in the range of 15.5 to 18.0 min. in the GPC chart. A ratio of the area for the cyclic polysiloxane to the total area for the organopolysiloxane obtained, in the GPC chart, was 2.8%.

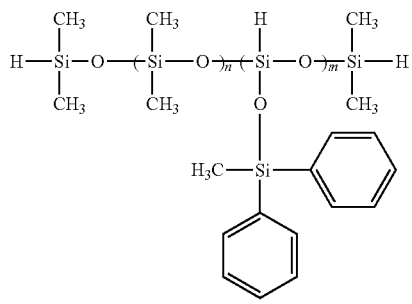

wherein n was 21 and m was 2, both on average.

Example 12

(Preparation Method in the Second Aspect of the Invention)

33.05 Grams (0.1 mol) of the organosiloxane prepared in Synthesis Example 5, 74.90 grams (0.05 mol) of polydimethylsiloxane-α,ω-diol, Mw-1,498, as the aforesaid compound represented by the formula (6), and 13.94 grams (0.12 mol) of dimethylvinylmethoxysilane, as the aforesaid compound represented by the formula (3), were mixed and heated to 80 degrees C. with stirring. 6.09 Grams of Al(OH)$_3$ were added to the mixture and, then, these compounds were reacted at 80 degrees C. for 32 hours, while distilling generated methanol off. The catalyst was removed from the reaction mixture by filtration and, then, methanol and water were distilled off from the mixture at a reduced pressure to obtain an oily branched organopolysiloxane represented by the following formula, hereinafter referred to as organopolysiloxane 15. Its Mw was 4,020. The integrated values and the chemical shift of the $^{29}$Si-NMR are as shown in Table 2. The determination solvent was deuterated chloroform. This branched organopolysiloxane was accompanied by a cyclic polysiloxane having a peak in the range of 15.5 to 18.0 min. in the GPC chart. A ratio of the area for the cyclic polysiloxane to the total area for the organopolysiloxane obtained, in the GPC chart, was 3.4%.

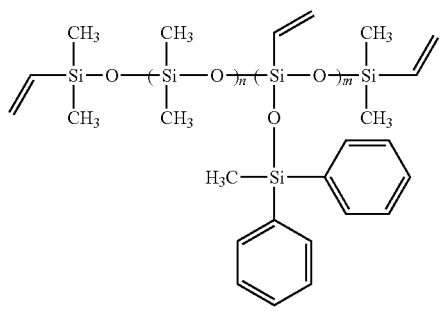

wherein n was 21 and m was 2, both on average.

Comparative Example 1

Figure 5:
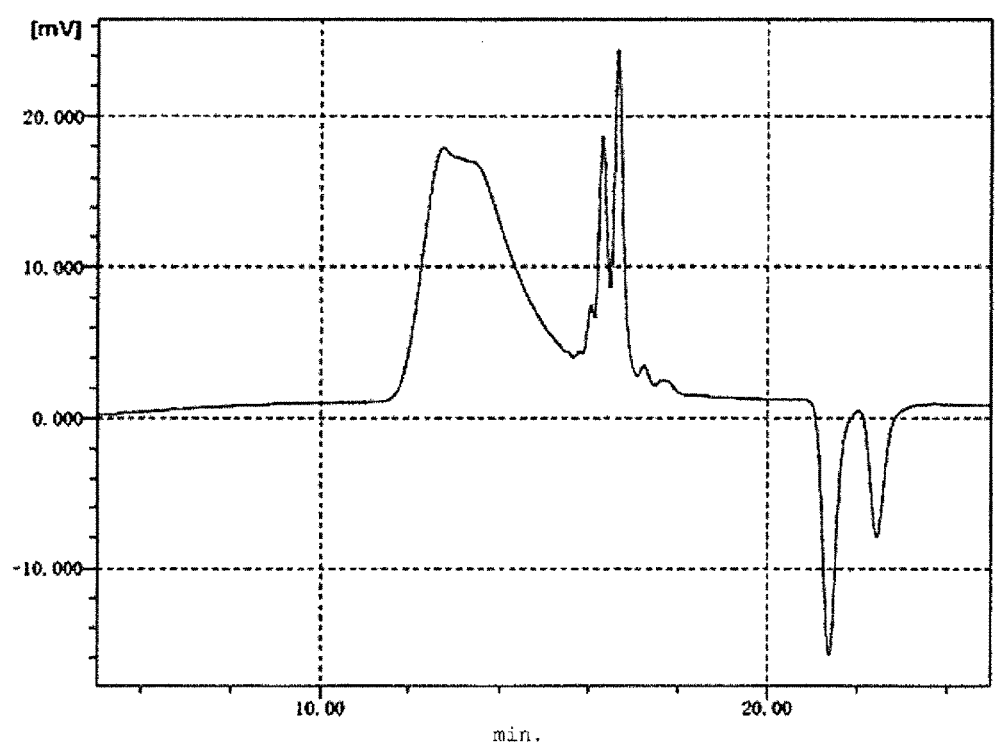
FIG. 5 is a GPC chart of the organopolysiloxane prepared in Comparative Example 1.
Figure 6:
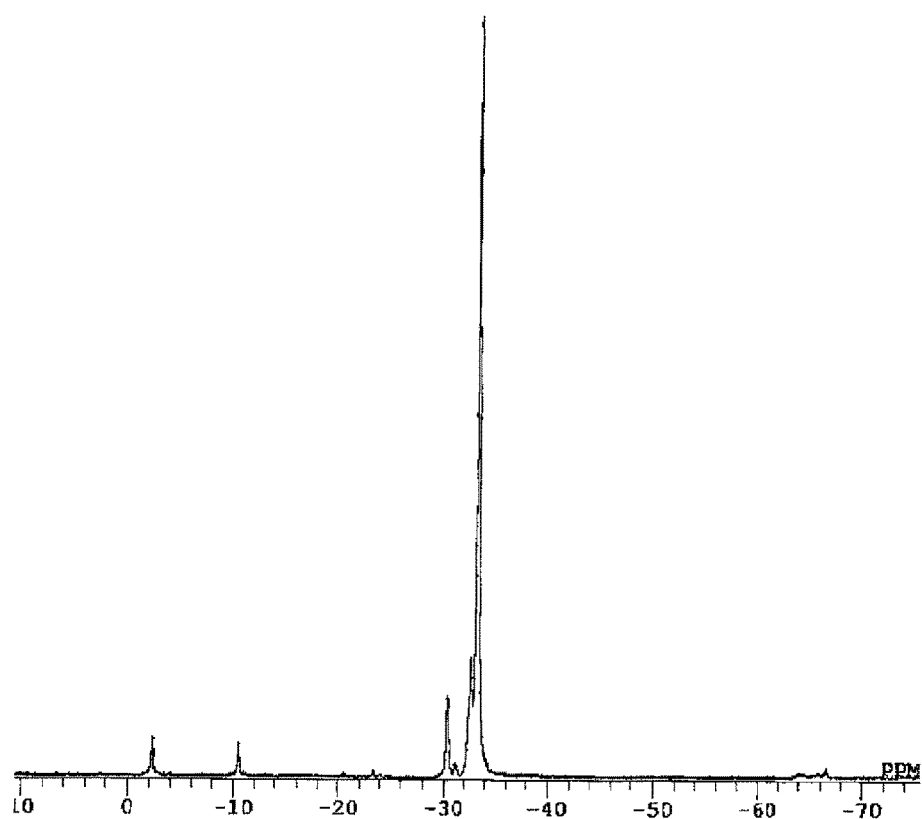
FIG. 6 is a chart of $^{29}$Si-NMR of the organopolysiloxane prepared in Comparative Example 1.

23.02 Grams (0.1 mol) of diphenylmethylsilanol (DPMS), 13.62 grams (0.1 mol) of methyltrimethoxysilane, 598.85 grams (1.11 mol) of polymethylphenylsilane-α,ω-diol (PMPSD) and 22.37 grams (0.12 mol) of 1,1,3,3-tetramethyl-1,3-divinyldisiloxane were mixed and 6.5 grams of water dissolving 3.12 grams of KOH were added dropwise in the mixture with stirring. The mixture was heated to 60 degrees C. and allowed to condensation react and equilibration react for 3 hours, and further allowed to equilibration react at 110 degrees C. for 6 hours, while distilling methanol and water off. Then, the reaction mixture was cooled to 80 degrees C. and neutralized with 9.56 grams of acetic acid. 500 Grams of toluene were added to the mixture. Then, the mixture was washed five times with 500 grams of water and, then, toluene and water were distilled off from the mixture at a reduced pressure to obtain an oily branched organopolysiloxane represented by the following formula, hereinafter referred to as organopolysiloxane 16. Its Mw was 6,412. The GPC chart of the organopolysiloxane is shown in FIG. 5. The $^{29}$Si-NMR spectra are shown in FIG. 6. The integrated values and the chemical shift of the $^{29}$Si-NMR are as shown in Table 3. The determination solvent was deuterated chloroform. This branched organopolysiloxane was accompanied by a cyclic polysiloxane having a peak in the range of 15.5 to 18.0 min. in the GPC chart. A ratio of the area for the cyclic polysiloxane to the total area for the organopolysiloxane obtained, in the GPC chart, was 26.0%.

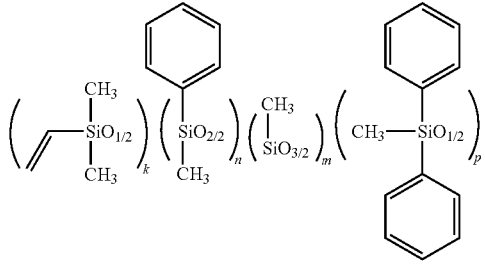

wherein n was 53, m was 1.8, k was 2 and p was 1.8, all on average.

Comparative Example 2

230.3 Grams (1 mol) of diphenylmethylsilanol (DPMS), 136.2 grams (1 mol) of methyltrimethoxysilane, and 153.55 grams (0.29 mol) of polymethylphenylsilane-α,ω-diol (PMPSD) were mixed. A solution of 2.60 g of KOH in 120.53 grams of water was added dropwise in the mixture with stirring. The mixture was then heated to 60 degrees C. and allowed to condensation react and equilibration react for 3 hours. The mixture was further allowed to equilibration react at 110 degrees C. for 4 hours, while distilling water off, to obtain a gelled organopolysiloxane, hereinafter referred to as organopolysiloxane 17. The organopolysiloxane could not be analyzed due to its gel state.

TABLE 1

|  | Chemical shift, ppm | Ex. 1 | Ex. 2 | Ex. 3 | Ex. 4 | Ex. 5 | | |
|---|---|---|---|---|---|---|---|---|
| Organopolysiloxane No. |  | 1 | 2 | 3 | 4 | 5 | 6 | 7 |
| $M^{Vi}$ | −1 to −4 | 1 | 1 | — | — | — | 1 | 1 |
| $M^{H}$ | −5 to −8 | — | — | — | 1 | — | — | — |
| $M^{2Ph}$ | −9 to −13 | 0.56 | 25.48 | 12.04 | 6.01 | 6.54 | 6.5 | 2.08 |
| $D^{Ph}$-OR | −19 to −25 | 0.01 | — | 1 | — | 1 | — | — |
| cyclic $D^{Ph}$ | −29 to −31.5 | 0.48 | 0.92 | 0.71 | 0.35 | — | — | — |
| $D^{Ph}$-(T) | −32 to −33 | 0.81 | 32.63 | 15.99 | 8.02 | — | — | — |
| $D^{Ph}$-(D) | −33 to −35 | 17.63 | 42.45 | 36.03 | 18.01 | — | — | — |
| $D^{Ph}$-(M) |  |  |  |  |  |  |  |  |
| cyclic $D^{Me}$ | −14 to −16 | — | — | — | — | — | — | 0.15 |
| $D^{Me}$-(T) | −17.5 to −18.5 | — | — | — | — | — | — | 2.6 |
| $D^{Me}$-(D) | −18.5 to −20.5 | — | — | — | — | — | — | 17.91 |
| $D^{Me}$-(M) |  |  |  |  |  |  |  |  |
| cyclic $D^{2Ph}$ | −42.0 to −45.0 | — | — | — | — | — | — | — |
| $D^{2Ph}$-T | −44.5 to −45.5 | — | — | — | — | — | — | — |
| $D^{2Ph}$-(D) | −45.5 to −50 | — | — | — | — | — | — | — |
| $D^{2Ph}$-(M) |  |  |  |  |  |  |  |  |
| T | −62 to −72 | 0.54 | 25.54 | 12.11 | 6.08 | 6.59 | 6.61 | 2.04 |
| T × 2 |  | 1.08 | 51.08 | 24.22 | 12.16 | 13.18 | 13.22 | 4.08 |

TABLE 2

|  | Chemical shift, ppm | Ex. 6 | Ex. 7 | Ex. 8 | Ex. 9 | Ex. 10 | Ex. 11 | Ex. 12 | |
|---|---|---|---|---|---|---|---|---|---|
| Organopolysiloxane No. |  | 8 | 9 | 10 | 11 | 12 | 13 | 14 | 15 |
| $M^{Vi}$ | −1 to −4 | 1 | 1 | 1 | 1 | 1 | — | — | 1 |
| $M^{H}$ | −5 to −8 | — | — | — | — | — | — | 1 | — |
| $M^{2Ph}$ | −9 to −13 | 2.06 | 2.01 | 2.06 | 2.03 | 2.07 | — | — | — |
| $D^{Ph}$-OR | −19 to −25 | — | — | 0.01 | — | — | — | — | — |
| cyclic $D^{Ph}$ | −29 to −31.5 | — | — | — | — | — | — | — | — |
| $D^{Ph}$-(T) | −32 to −33 | — | — | — | — | — | — | — | — |
| $D^{Ph}$-(D) | −33 to −35 | — | — | — | — | — | — | — | — |
| $D^{Ph}$-(M) |  |  |  |  |  |  |  |  |  |
| $D^{Me}$-OR | −8 to −12 | — | — | — | — | — | 1 | — | 0.01 |
| cyclic $D^{Me}$ | −14 to −16 | 0.18 | 0.62 | 0.13 | 0.11 | 0.14 | 0.08 | 0.09 | 0.12 |
| $D^{Me}$-(T) | −17.5 to −18.5 | 2.58 | 3.11 | 2.57 | 2.66 | 2.51 | 1.33 | 1.35 | 1.30 |
| $D^{Me}$-(D) | −18.5 to −20.5 | 17.88 | 18.92 | 23.9 | 17.54 | 16.52 | 8.82 | 8.80 | 8.79 |
| $D^{Me}$-(M) |  |  |  |  |  |  |  |  |  |
| cyclic $D^{2Ph}$ | −42.0 to −45.0 | — | — | 0.19 | — | — | — | — | — |
| $D^{2Ph}$-T | −44.5 to −45.5 | — | — | 0.14 | — | 1.78 | — | — | — |
| $D^{2Ph}$-(D) | −45.5 to −50 | — | — | 2.84 | — | 0.14 | — | — | — |
| $D^{2Ph}$-(M) |  |  |  |  |  |  |  |  |  |
| T | −62 to −72 | 2.03 | 2.05 | 2.04 | 2.01 | 1.91 | 1.02 | 1.02 | 0.99 |
| T × 2 |  | 4.06 | 4.1 | 4.08 | 4.02 | 3.82 | 2.04 | 2.04 | 1.98 |

TABLE 3

| | Chemical shift, ppm | Com. Ex. 1 | Com. Ex. 2 |
|---|---|---|---|
| Organopolysiloxane No. | | 16 | 17 |
| $M^{vi}$ | −1 to −4 | 1 | Impossible |
| $M^H$ | −5 to −8 | — | to |
| $M^{2Ph}$ | −9 to −13 | 0.88 | analyzed |
| $D^{Ph}$-OR | −19 to −25 | — | |
| cyclic $D^{Ph}$ | −29 to −31.5 | 3.45 | |
| $D^{Ph}$-(T) | −32 to −33 | 4.96 | |
| $D^{Ph}$-(D) | −33 to −35 | 21.77 | |
| $D^{Ph}$-(M) | | | |
| $D^{Me}$-OR | −8 to −12 | — | |
| cyclic $D^{Me}$ | −14 to −16 | — | |
| $D^{Me}$-(T) | −17.5 to −18.5 | — | |
| $D^{Me}$-(D) | −18.5 to −20.5 | — | |
| $D^{Me}$-(M) | | | |
| cyclic $D^{2Ph}$ | −42.0 to −45.0 | — | |
| $D^{2Ph}$-T | −44.5 to −45.5 | — | |
| $D^{2Ph}$-(D) | −45.5 to −50 | — | |
| $D^{2Ph}$-(M) | | | |
| T | −62 to −72 | 0.89 | |
| T × 2 | | 1.78 | |

In the aforesaid Tables 1 to 3, D means a D unit, T means a T unit, and M means a M unit. For instance, the value of "$D^{Ph}$-(T)" is a chemical shift of a silicon atom which is in a D unit being next to a T unit and to which one phenyl group and one methyl group bond. The value of "$D^{2Ph}$-(T)" is a chemical shift of a silicon atom which is in a D unit being next to a T unit and to which two phenyl groups bond. The value of "$D^{Me}$-(T)" is a chemical shift of a silicon atom which is in a D unit being next to a T unit and to which two methyl groups bond.

In the aforesaid Tables 1 to 3, the value of "T×2" is a theoretical value of "D-(T)" in a case where the branch structure of the organosiloxane represented by the formula (1) is introduced in the organopolysiloxane without any cleavage of the siloxane bond in the formula (1) so as to form the repeating structure, D-(T)-D. For instance, when a total of the value of $D^{Ph}$-(T), $D^{2Ph}$-(T) and $D^{Me}$-(T) is smaller than the value of "T×2" in the table, this means that the number of a D unit bonded to one T unit is 2 or less and a sequence, D-(T)-(T)-D, is present in a molecular. When a total of the value of $D^{Ph}$-(T), $D^{2Ph}$-(T) and $D^{Me}$-(T) is larger than the value of "T×2" in the table, this means that three D units bond to one T unit, as a result from that a part of the siloxane bonds in the formula (1) cleaved.

As shown in Tables 1 and 2, the total of the value of $D^{Ph}$-(T), $D^{2Ph}$-(T) and $D^{Me}$-(T) is smaller than the value of "T×2" in the branched organopolysiloxane prepared in the present method. As mentioned above, this means that the number of a D unit bonded to one T unit was 2 or less and a sequence, D-(T)-(T)-D, was present in the molecular. That is the branched structure of the compound represented by the formula (1) was introduced in the organopolysiloxane, as intended. Accordingly a desired oorganopolysiloxane having a short branch is prepared easily in the present method, as intended.

As shown in Table 3, the value of $D^{Ph}$-(T) is larger than the value of "T×2" in the organopolysiloxane prepared in Comparative Example 1. Therefore, the organopolysiloxane had a structure wherein three D units bonded to one T unit. Further, the value of $D^{Ph}$-(T) is larger than the theoretical value calculated for T×3. This means that a M unit bonded hardly to a T unit. Here, the reason why the value of $D^{Ph}$-(T) was larger than the theoretical value calculated for T×3 is that the peak of $D^{Ph}$-(D) and the peak of $D^{Ph}$-(T) are very close each other and their GPC spectra overlapped with each other.

The "cyclic $D^{ph}$", "cyclic $D^{2ph}$" and "cyclic $D^{Me}$" in Tables 1 to 3 are chemical shifts in the cyclic polysiloxane. The cyclic polysiloxane is, for instance, represented by the following formula.

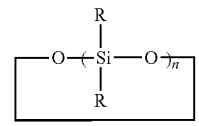

wherein R is a methyl group or a phenyl group and n is 3 to 5 or so.

As understood from the integrated value in Table 3 and the ratio of the areas in the GPC chart mentioned above, the organopolysiloxane prepared in Comparative Example 1 was accompanied by a lot of cyclic polysiloxanes. In contrast, as seen from the integrated value in Tables 1 and 2 and the ratios of the areas in the GPC charts as mentioned above, the amounts of the cyclic polysiloxane by which the branched organopolysiloxanes prepared in the present methods were accompanied were smaller. That is, formation cyclic polysiloxane is suppressed in the present methods.

INDUSTRIAL APPLICABILITY

According to the method of the present invention, a short silicone branch is efficiently introduced in a silicone main chain. The branched organopolysiloxane obtained in the present method may be used by itself as a silicone oil. The branched organopolysiloxane may be incorporated in a silicone elastomer-preparing composition to improve properties of a cured product. Therefore, the present branched organopolysiloxane is very useful.

The invention claimed is:

1. A method for preparing a branched organopolysiloxane represented by the following formula (11):

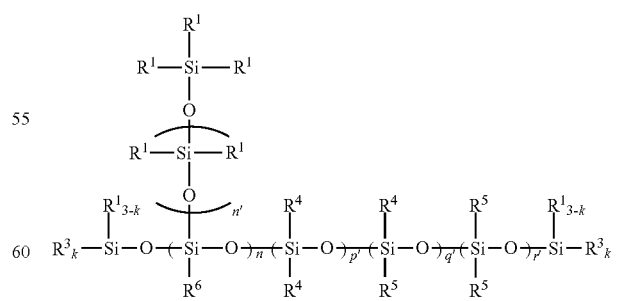

(11)

wherein $R^1$ is, independently of each other, a substituted or unsubstituted, saturated hydrocarbon group having 1 to 12 carbon atoms or a substituted or unsubstituted, aromatic hydrocarbon group having 6 to 12 carbon atoms, $R^3$ is, independently of each other, a hydrogen atom or an alkenyl group having 2 to 10 carbon atoms, $R^4$ is, independently of each other, the afore-mentioned groups defined for $R^3$ or a substituted or unsubstituted, saturated hydrocarbon group having 1 to 12 carbon atoms, $R^5$ is, independently of each other, the afore-mentioned groups defined for $R^3$ or a substituted or unsubstituted, aromatic hydrocarbon group having 6 to 12 carbon atoms, $R^6$ is selected from the afore-mentioned groups defined for $R^1$ and $R^3$, n' is an integer of from 0 to 3, k is an integer of from 0 to 3, n is an integer of from 3 to 100, p' is an integer of from 0 to 50, q' is an integer of from 0 to 50, r' is an integer of from 0 to 25, a total of p', q' and r' is 1 or more, a total of n, p', q' and r' is 5 to 200, wherein the parenthesized siloxane units may form a block unit or bond randomly;

wherein the method comprises steps of
subjecting an organo(poly)siloxane represented by the following formula (1) to a condensation reaction in the presence of a catalyst to thereby prepare an organopolysiloxane represented by the following formula (2);

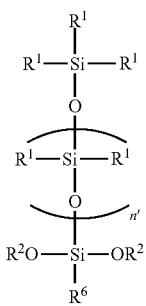

(1)

wherein $R^1$, $R^6$ and n' are as defined above and $R^2$ is a hydrogen atom or a saturated hydrocarbon group having 1 to 6 carbon atoms,

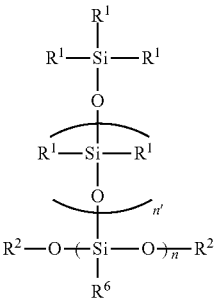

(2)

wherein $R^1$, $R^2$, $R^6$, n' and n are as defined above,
wherein the catalyst is at least one selected from the group consisting of hydroxides of the elements in Group 2 of the periodic table, hydroxide hydrates of the elements in Group 2 of the periodic table, oxides of the elements in Group 2 of the periodic table, and hydroxides and oxides of the metal elements in Groups 3-15 of the periodic table,
and reacting the organopolysiloxane represented by the formula (2) with an organic silicon compound represented by the following formula (13) to prepare the branched organopolysiloxane represented by the aforesaid formula (11);

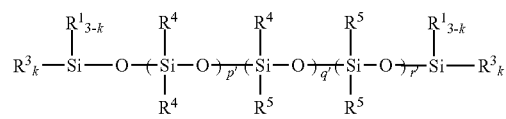

(13)

wherein $R^1$, $R^3$, $R^4$, $R^5$, k, p', q' and r' are as defined above.

2. The method according to claim 1, wherein n' is zero.

3. The method according to claim 1, wherein the catalyst is surface treated with a silane coupling agent before the catalyst is used in the condensation reaction.

* * * * *